(12) United States Patent
Jiang

(10) Patent No.: US 10,925,117 B2
(45) Date of Patent: Feb. 16, 2021

(54) METHOD AND APPARATUS FOR TRANSMITTING RRC MESSAGE

(71) Applicant: BEIJING XIAOMI MOBILE SOFTWARE CO., LTD., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/400,202

(22) Filed: May 1, 2019

(65) Prior Publication Data

US 2019/0261457 A1    Aug. 22, 2019

Related U.S. Application Data

(63) Continuation of application No. PCT/CN2016/104577, filed on Nov. 4, 2016.

(51) Int. Cl.
*H04L 5/00* (2006.01)
*H04W 88/10* (2009.01)
(Continued)

(52) U.S. Cl.
CPC ............ *H04W 88/10* (2013.01); *H04L 1/08* (2013.01); *H04W 24/10* (2013.01);
(Continued)

(58) Field of Classification Search
None
See application file for complete search history.

(56) References Cited

U.S. PATENT DOCUMENTS 10,367,677 B2 * 7/2019 Parkvall ............... H04J 11/0059
2015/0223095 A1 * 8/2015 Centonza .............. H04B 17/24
455/67.11
(Continued)

FOREIGN PATENT DOCUMENTS

CN     105165057 A    12/2015
CN     105453652 A    3/2016
(Continued)

OTHER PUBLICATIONS

First Office Action of Chinese Application No. 201680001267.X dated Sep. 12, 2019 with English translation, (27 page).
(Continued)

*Primary Examiner* — Sithu Ko
(74) *Attorney, Agent, or Firm* — Arch & Lake LLP

(57) ABSTRACT

An apparatus for transmitting a Radio Resource Control (RRC) message, wherein the apparatus is applied in a communication system in which a plurality of connections are established between a terminal and an access network device, the apparatus comprising: a processor; and a memory configured to store instructions executable by the processor; wherein the processor is configured to: receive RRC diversity configuration information sent by the access network device, wherein the RRC diversity configuration information is configuration information required when the terminal enables or disables RRC diversity; and determine whether to enable the RRC diversity according to the RRC diversity configuration information, wherein the RRC diversity is a way of transmitting identical uplink RRC messages through at least two connections.

20 Claims, 13 Drawing Sheets

(51) Int. Cl.
  *H04W 76/15*   (2018.01)
  *H04W 76/27*   (2018.01)
  *H04W 24/10*   (2009.01)
  *H04W 72/08*   (2009.01)
  *H04W 88/06*   (2009.01)
  *H04L 1/08*    (2006.01)
  *H04W 84/12*   (2009.01)

(52) U.S. Cl.
  CPC ......... *H04W 72/085* (2013.01); *H04W 76/15* (2018.02); *H04W 76/27* (2018.02); *H04W 88/06* (2013.01); *H04W 84/12* (2013.01)

(56) References Cited

U.S. PATENT DOCUMENTS

| | | | |
|---|---|---|---|
| 2015/0334637 A1 | 11/2015 | Kim | |
| 2015/0350969 A1* | 12/2015 | Dudda | H04W 36/0055 370/331 |
| 2015/0358957 A1* | 12/2015 | Kim | H04W 48/08 455/450 |
| 2015/0365872 A1* | 12/2015 | Dudda | H04W 36/0055 455/436 |
| 2016/0021592 A1* | 1/2016 | Vesely | H04W 76/15 370/331 |
| 2016/0174124 A1* | 6/2016 | Basu Mallick | H04W 74/006 370/331 |
| 2016/0269982 A1* | 9/2016 | Larsson | H04L 1/00 |
| 2016/0286449 A1* | 9/2016 | Choi | H04W 36/18 |
| 2017/0150384 A1* | 5/2017 | Rune | H04W 72/085 |
| 2017/0311217 A1* | 10/2017 | Jung | H04W 36/023 |
| 2017/0374703 A1* | 12/2017 | Sang | H04W 76/15 |
| 2019/0174481 A1* | 6/2019 | Wei | H04W 36/0055 |
| 2019/0182689 A1* | 6/2019 | Martin | H04W 24/04 |

FOREIGN PATENT DOCUMENTS

| | | |
|---|---|---|
| CN | 105519167 A | 4/2016 |
| CN | 105813091 A | 7/2016 |

OTHER PUBLICATIONS

Ericsson et al., "R2-131211, Enhancing Mobility Robustness and Offloading Potential with RRC Diversity", 3GPP TSG-RAN WG2 #81bis, Apr. 19, 2013 (Apr. 19, 2013), 8 pages.

Ericsson, "R2-166776, RRC Diversity", 3GPP TSG-RAN WG2 #95bis, Oct. 14, 2016 (Oct. 14, 2016), 3 pages.

Nokia et al., "R2-166246, Control Plane Architecture for NR-NR Multi-Connectivity", 3GPP TSG-RAN WG2 Meeting #95bis, Oct. 14, 2016 (Oct. 14, 2016), 3 pages.

Catt, "R2-164710, Discussion on RRC Diversity for LTE-NR Tight Interworking", 3GPP TSGRAN WG2Meeting#95, Aug. 26, 2016 (Aug. 26, 2016), 3 pages.

Nokia et al., "R2-164956, NR Multi-Connectivity in DU/CU Architecture", TSG-RAN WG2 Meeting #95, Aug. 26, 2016 (Aug. 26, 2016), 3 pages.

International Search Report and Written Opinion (including English translation) issued in PCT/CN2016/104577, dated Jul. 24, 2017, 10 pages.

* cited by examiner

METHOD AND APPARATUS FOR TRANSMITTING RRC MESSAGE

CROSS-REFERENCE TO RELATED APPLICATION

This application is a continuation of PCT Application No. PCT/CN2016/104577, filed on Nov. 4, 2016 and entitled "RRC Message Transmitting Method and Apparatus," the entire contents of which are incorporated herein by reference.

TECHNICAL FIELD

The present disclosure relates to the field of wireless communication technology, and in particular, to a Radio Resource Control (RRC) message transmitting method and apparatus.

BACKGROUND

An RRC message is a signaling message required to establish, re-establish, maintain and release an RRC connection between a User Equipment (UE) and an access network device. The RRC message sent by the UE to the access network device is an uplink RRC message, and the RRC message sent by the access network device to the UE is a downlink RRC message.

SUMMARY

Embodiments of the present disclosure provide a method and apparatus for transmitting Radio Resource Control (RRC) message. The technical solutions are as follows.

In a first aspect, there is provided an apparatus for transmitting a Radio Resource Control (RRC) message, wherein the apparatus is applied in a communication system in which a plurality of connections are established between a terminal and an access network device, the apparatus comprising: a processor; and a memory configured to store instructions executable by the processor; wherein the processor is configured to: receive RRC diversity configuration information sent by the access network device, wherein the RRC diversity configuration information is configuration information required when the terminal enables or disables RRC diversity; determine whether to enable the RRC diversity according to the RRC diversity configuration information, wherein the RRC diversity is a way of transmitting identical uplink RRC messages through at least two connections.

In some embodiments, the RRC diversity configuration information comprises an enable indication and a diversity threshold; and determining whether to enable the RRC diversity according to the RRC diversity configuration information comprises: enabling the RRC diversity according to the enable indication; and determining, according to the diversity threshold, connections for transmitting the uplink RRC messages.

In some embodiments, the access network device comprises at least two Distribution Units (DUs) in a 5G communication system; the diversity threshold comprises a first diversity threshold; the RRC diversity configuration information further comprises a DU list comprising identifiers of DUs that support RRC diversity; and determining, according to the diversity threshold, connections for transmitting the uplink RRC messages comprises: detecting whether downlink channel quality of a first DU is lower than the first diversity threshold, wherein the first DU is a DU that a primary serving cell corresponds to when the terminal establishes an initial connection; when the downlink channel quality of the first DU is lower than the first diversity threshold, determining at least one of second DUs as a target DU, or determining the first DU and the at least one of second DUs as target DUs, wherein the second DUs are DUs that the DU identifiers in the DU list correspond to; and selecting at least two connections supporting the RRC diversity between the terminal and the target DUs as connections for transmitting the uplink RRC messages.

In some embodiments, the diversity threshold further comprises a second diversity threshold; and determining at least one of the second DUs as the target DU comprises at least one of: detecting whether downlink channel quality of each of the second DUs is higher than the second diversity threshold; and when second DU candidates whose downlink channel quality is higher than the second diversity threshold exist, determining one second DU candidate randomly selected as the target DU; and detecting whether downlink channel quality of each of the second DUs is higher than the second diversity threshold; and when second DU candidates whose downlink channel quality is higher than the second diversity threshold exist, determining the second DU candidate with the best downlink channel quality as the target DU.

In some embodiments, the diversity threshold further comprises a second diversity threshold; and determining the first DU and at least one of the second DUs as the target DUs comprises: detecting whether downlink channel quality of each of the second DUs is higher than the second diversity threshold; and when the downlink channel quality of all the second DUs is lower than the second diversity threshold, determining the first DU and the at least one of the second DUs as the target DUs.

In some embodiments, the access network device comprises at least two Distribution Units (DUs) in a 5G communication system; the diversity threshold comprises a second diversity threshold; the RRC diversity configuration information further comprises a DU list comprising identifiers of DUs that support RRC diversity; and determining, according to the diversity threshold, connections for transmitting the uplink RRC messages comprises: detecting whether downlink channel quality of each of second DUs is higher than the second diversity threshold, wherein the second DUs are DUs that the DU identifiers in the DU list correspond to; when second DU candidates whose downlink channel quality is higher than the second diversity threshold exist, determining one second DU candidate randomly selected as a target DU, or determining the second DU candidate with the best downlink channel quality as the target DU; selecting at least two connections supporting the RRC diversity between the terminal and the target DU as connections for transmitting the uplink RRC message.

In some embodiments, after detecting whether downlink channel quality of each of the second DUs is higher than the second diversity threshold, the processor is further configured to: when downlink channel quality of all the second DUs is lower than the second diversity threshold, determining the first DU and the at least one of the second DUs as the target DUs, wherein the first DU is a DU that a primary serving cell corresponds to when the terminal establishes an initial connection.

In some embodiments, the access network device comprises at least two Distribution Units (DUs) in a 5G communication system; the diversity threshold comprises a first diversity threshold; and determining, according to the diversity threshold, connections for transmitting the uplink RRC message comprises: detecting whether downlink channel quality of a first DU is lower than the first diversity threshold, wherein the first DU is a DU that a primary serving cell corresponds to when the terminal establishes an initial connection; when the downlink channel quality of the first DU is lower than the first diversity threshold, determining at least one of third DUs as the target DU, or determining the first DU and the at least one of third DUs as the target DUs, wherein the third DUs are DUs that support transmission of control plane messages; and selecting at least two connections supporting transmission of control plane messages between the terminal and the target DUs as connections for transmitting the uplink RRC messages.

In some embodiments, the diversity threshold further comprises a second diversity threshold; and determining at least one of the third DUs as the target DU comprises: detecting whether downlink channel quality of each of the third DUs is higher than the second diversity threshold; and when third DU candidates whose downlink channel quality is higher than the second diversity threshold exist, determining one third DU candidate randomly selected as the target DU; or, detecting whether downlink channel quality of each of the third DUs is higher than the second diversity threshold; and when third DU candidates whose downlink channel quality is higher than the second diversity threshold exist, determining the third DU candidate with the best downlink channel quality as the target DU.

In some embodiments, the diversity threshold further comprises a second diversity threshold; and determining the first DU and at least one of the third DU as the target DUs comprises: detecting whether downlink channel quality of each of the third DUs is higher than the second diversity threshold; and when the downlink channel quality of all the third DUs is lower than the second diversity threshold, determining the first DU and the at least one of the third DUs as the target DUs.

In some embodiments, the access network device comprises at least two Distribution Units (DUs) in a 5G communication system; the diversity threshold comprises a second diversity threshold; and determining, according to the diversity threshold, connections for transmitting the uplink RRC message comprises: detecting whether downlink channel quality of each of the third DUs is higher than the second diversity threshold, wherein the third DUs are DUs that support transmission of control plane messages; when third DU candidates whose downlink channel quality is higher than the second diversity threshold exist, determining one third DU candidate randomly selected as the target DU, or determining the third DU candidate with the best downlink channel quality as the target DU; and selecting at least two connections supporting transmission of control plane messages between the terminal and the target DU as connections for transmitting the uplink RRC message.

In some embodiments, after detecting whether the downlink channel quality of each of the third DUs is higher than the second diversity threshold, the processor is further configured to: when the downlink channel quality of all the third DUs is lower than the second diversity threshold, determine the first DU and the at least one of the third DUs as the target DUs, wherein the first DU is a DU that a primary serving cell corresponds to when the terminal establishes an initial connection.

In some embodiments, the RRC diversity configuration information comprises an enable indication and an information unit for indicating a target connection; before receiving, by the terminal, RRC diversity configuration information sent by the access network device, the processor is further configured to: transmit an uplink reference signal to the access network device, wherein the uplink reference signal is used to measure uplink channel quality of the connections; and determining whether to enable the RRC diversity according to the RRC diversity configuration information comprises: enabling the RRC diversity according to the enable indication; and determining, according to the information unit for indicating a target connection, connections for transmitting the uplink RRC message.

In some embodiments, the access network device comprises a first access network device of a first communication system and a second access network device of a second communication system, wherein the first access network device is connected to the second access network device; the RRC diversity configuration information comprises an indication of enabling interworking RRC diversity and a diversity threshold; and determining whether to enable the RRC diversity according to the RRC diversity configuration information comprises: enabling, according to the indication of enabling interworking RRC diversity, interworking RRC diversity between the first access network device and the second access network device; and determining, according to the diversity threshold, connections for transmitting the uplink RRC message; wherein the first communication system is one of a 5G communication system, an LTE communication system, and a WLAN communication system, and the second communication system is another one of a 5G communication system, an LTE communication system, and a WLAN communication system.

In some embodiments, the diversity threshold comprises a first diversity threshold and a second diversity threshold; and determining according to the diversity threshold, connections for transmitting the uplink RRC message comprises: detecting whether downlink channel quality of all or designated ones of the first access network devices is lower than the first diversity threshold, wherein the designated one of the first access network devices are first access network devices when the terminal establishes an initial connection, or first access network devices that support RRC diversity; when the downlink channel quality of all or designated ones of the first access network devices is lower than the first diversity threshold, detect whether downlink channel quality of the second access network device is higher than the second diversity threshold; when the downlink channel quality of the second access network device is higher than the second diversity threshold, determining the first access network devices and the second access network device as target access network devices; determining at least two connections between the terminal and the target access network devices as connections for transmitting the uplink RRC message.

In some embodiments, the diversity threshold comprises a relative diversity threshold; and determining, according to the diversity threshold, connections for transmitting the uplink RRC message comprises: detecting whether a difference obtained by subtracting the downlink channel quality of a best first access network device from the downlink channel quality of a worst second access network device is greater than the relative diversity threshold; when the difference is greater than the relative diversity threshold, determining the first and second access network device as target access network devices; and determining at least two connections between the terminal and the target access network devices as connections for transmitting the uplink RRC message, wherein the best first access network device is a first access network device when the terminal establishes an initial connection, or a first access network device with the best downlink channel quality that supports RRC diversity, or a first access network device with the best downlink channel quality that supports transmission of control plane messages; and the worst second access network device is a second access network device with the worst downlink channel quality that supports RRC diversity, or a second access network device with the worst downlink channel quality that supports transmission of control plane messages.

In a second aspect, there is provided an apparatus for transmitting a Radio Resource Control (RRC) message, wherein the apparatus is applied in a communication system in which a plurality of connections are established between a terminal and an access network device, the apparatus comprising: a processor; and a memory configured to store instructions executable by the processor; wherein the processor is configured to: generate RRC diversity configuration information of the terminal, wherein the RRC diversity configuration information is configuration information required when the terminal enables or disables RRC diversity; transmit the RRC diversity configuration information to the terminal, wherein the RRC diversity configuration information is used for determining whether the terminal enables RRC diversity, and the RRC diversity is a way of transmitting identical uplink RRC messages through at least two connections.

In some embodiments, the RRC diversity configuration information comprises one of: an enable indication for indicating the terminal to enable the RRC diversity and a diversity threshold for determining a radio bearer for transmitting the uplink RRC messages; and a disable indication for indicating the terminal to disable the RRC diversity.

In some embodiments, the RRC diversity configuration information comprises an enable indication and an information unit for indicating a target connection; prior to generating, by the access network device, RRC diversity configuration information of the terminal, the processor is further configured to: receive, by the access network device, an uplink reference signal sent by the terminal; generating, by the access network device, the RRC diversity configuration information of the terminal comprises: measuring and obtaining, by the access network device, uplink channel quality of the connections according to the uplink reference signal; determining, by the access network device, the target connection according to the uplink channel quality; and generating, by the access network device, the RRC diversity configuration information that carries the information unit for indicating a target connection.

In some embodiments, the RRC diversity configuration information comprises: an indication of enabling interworking RRC diversity and a diversity threshold, wherein the indication of enabling interworking RRC diversity is used for indicating the terminal to enable the interworking RRC diversity between a first access network device and a second access network device; and the diversity threshold is used for determining a radio bearer for transmitting the uplink RRC message.

It is to be understood that both the foregoing general description and the following detailed description are exemplary and explanatory only and are not restrictive of the present disclosure.

BRIEF DESCRIPTION OF THE DRAWINGS

The drawings herein are incorporated in and constitute a part of this specification of the present disclosure, showing embodiments consistent with the present disclosure, and explaining the principles of the present disclosure together with the description.

DETAILED DESCRIPTION

Figure 1:
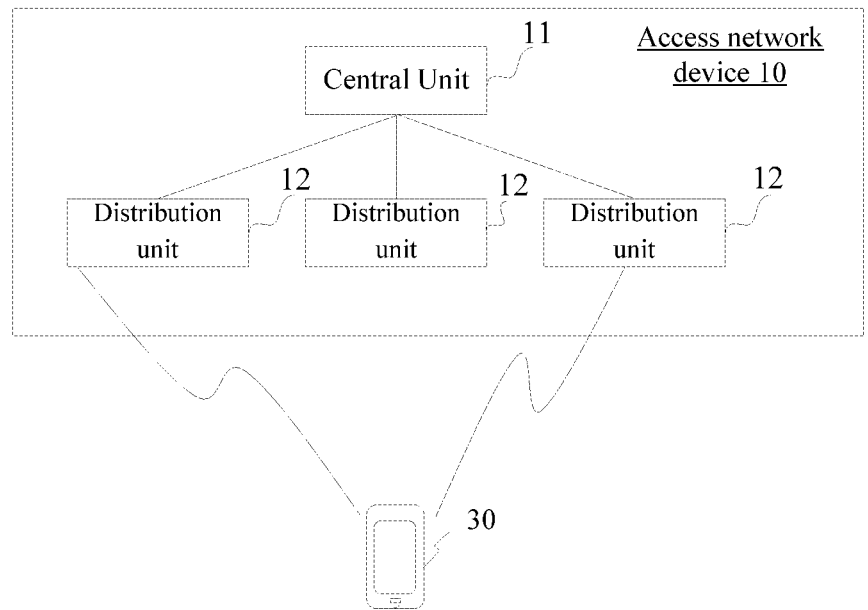
FIG. 1 is a schematic diagram of a communication system shown according to an example.

Hereinafter, examples will be described in detail. The embodiments are shown in the drawings. In the following description when referring to the drawings, the same numerals in the different drawings denote the same or similar elements unless otherwise indicated. The embodiments described in the following examples are not representative of all embodiments consistent with the present disclosure. Rather, they are merely examples of devices and methods consistent with some aspects of the present disclosure as detailed in the appended claims.

FIG. 1 is a schematic diagram of a communication system shown according to an example of the present disclosure. The communication system utilizes 5G. As shown in FIG. 1, the communication system includes: an access network device 10 and a terminal 30.

In some embodiments, the access network device 10 employs a centralized and distributed architecture. That is, the access network device 10 includes a Central Unit (CU) 11 and at least two distribution units 12. Generally, the Central Unit 11 is integrated with protocol stacks of a Packet Data Convergence Protocol (PDCP) layer, a Radio Link Control (RLC) protocol layer, and a Media Access Control (MAC) layer. The MAC layer includes a plurality of MAC entities, each of which corresponds to one scheduler. Each scheduler is used to provide radio resources required for one connection, that is, each scheduler corresponds to one connection. A Physical Layer (PHY) protocol stack is provided in the distribution units 12.

The Central Unit 11 is used to connect the core network in the communication system, and is connected and communicates with at least two distribution units 12. In some embodiments, the Central Unit 11 and the at least two distribution units 12 may be connected via optical fibers, or via other communication lines.

A wireless connection is established between the at least two distribution units 12 and the terminal 30 via a radio air interface (also referred to as an air interface or an air interface). In some embodiments, the radio air interface is a radio air interface based on the 5th generation (5G) of mobile communication network technology standard, for example, the radio air interface is a New Radio (NR). Alternatively, the radio air interface may also be a radio air interface based on the next generation of mobile communication network technology standards subsequent to the 5G.

In some embodiments, in the communication system, the terminal 30 establishes a connection with a plurality of distribution units 12. The terminal may also establish a plurality of connections with the same distribution unit 12. The connections may be Radio Bearers which are further divided into: a Signaling Radio and a Data Radio Bearer (DRB). The SRB is a bearer for transmitting control plane messages and the DRB is a bearer for transmitting data plane messages. For the terminal 30, each distribution unit 12 can be regarded as an independent access network device.

What is different from FIG. 1 is that, in some other embodiments of the present disclosure, the communication system is a heterogeneous communication system employing a plurality of Radio Access Technologies (RATs), that is, the heterogeneous communication system includes at least two kinds of communication systems employing different wireless communication protocols. For example, the heterogeneous communication system includes a first communication system and a second communication system. The first communication system is a 5G communication system, and the second communication system is an LTE communication system; or, the first communication system is a 5G communication system, and the second communication system is a WLAN communication system. Likewise, the first communication system may be one of a 5G communication system, an LTE communication system, and a WLAN communication system; and the second communication system may be another one of a 5G communication system, an LTE communication system, and a WLAN communication system. In still other embodiments of the present disclosure, the communication system may also be obtained simultaneously by a 5G communication system, an LTE communication system, and a WLAN communication system in a heterogeneous manner.

Figure 2:
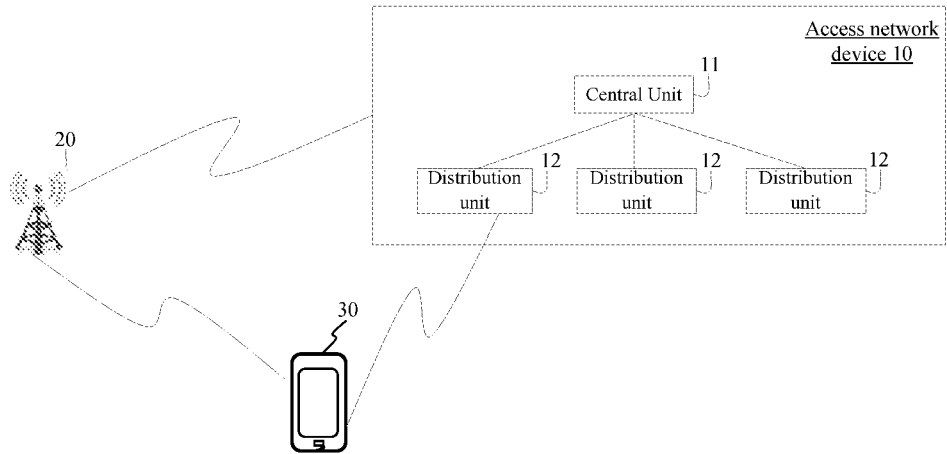
FIG. 2 is a schematic diagram of a communication system shown according to another example.

FIG. 2 is a schematic diagram of a communication system shown according to another example of the present disclosure. The communication system includes a first access network device 10 in a 5G communication system, a second access network device 20 in an LTE communication system, and a terminal 30.

The first access network device 10 in the 5G communication system employs a centralized and distributed architecture. That is, the first access network device 10 includes a Central Unit 11 and at least two distribution units 12.

The second access network device 20 in the LTE communication system is an eNodeB (eNB).

The first access network device 10 and the second access network device 20 can be connected via optical fibers or other communication lines, thereby supporting a 5G NR-LTE tight interworking mode between 5G and LTE. In this mode, the terminal 30 can transmit data in a cooperative manner through the 5G communication system and the LTE communication system (the two communication systems transmit simultaneously or asynchronously). Similarly, if the second communication system employs a WLAN communication system, the second access network device 20 is a wireless Access Point (AP), thereby supporting a 5G NR-WLAN tight interworking mode between 5G and WLAN. In this mode, the terminal 30 can transmit data in a cooperative manner through the 5G communication system and the WLAN communication system.

The terminal 30 is connected to the first access network device 10 and the second access network device 20 via radio air interfaces. In some embodiments, the terminal 30 establishes connections with the plurality of distribution units 12, and also establishes a plurality of connections with the same distribution unit 12. In some embodiments, the terminal 30 establishes a plurality of connections with the second access network device 20.

For the terminal 30, each distribution unit 12 can be regarded as a first access network device, and the plurality of distribution units 12 can be regarded as a plurality of first access network devices.

It should be noted that the terminal 30 has different names in different communication systems. For example, the terminal 30 may be a UE in an LTE communication system, a Station in a WLAN communication system, or a terminal device in a 5G communication system. The name of the terminal 30 is not limited in this embodiment, and meanwhile the name of the access network device is not limited in this embodiment, either.

Figure 3A:
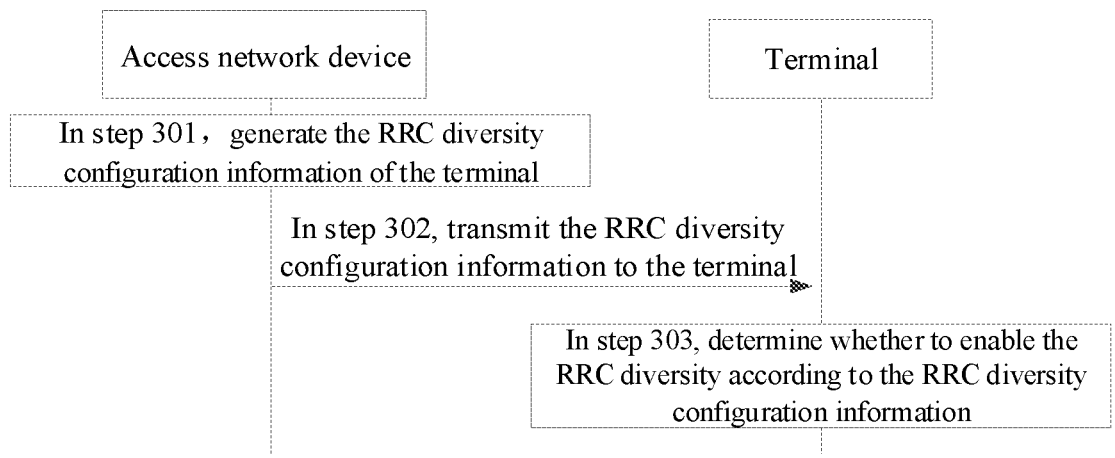
FIG. 3A is a flowchart of a method for transmitting an RRC message shown according to an example.

FIG. 3A is a flowchart of a method for transmitting an RRC message shown according to an example. This method can be applied to the communication system shown in FIG. 1. The method may include the following steps.

In Step 301, the access network device generates the RRC diversity configuration information of the terminal.

The RRC diversity configuration information is the configuration information required when the terminal enables or disables RRC diversity.

The RRC diversity is a way of transmitting identical uplink RRC messages through at least two connections. In some embodiments, the RRC diversity is a way of transmitting identical uplink RRC messages by the terminal to the same access network device through at least two connections, and/or, the RRC diversity is a way of transmitting identical uplink RRC messages by the terminal to different access network devices through at least two connections (different access network devices will aggregate and merge the uplink RCC message).

In Step 302, the access network device transmits the RRC diversity configuration information to the terminal.

Correspondingly, the terminal receives the RRC diversity configuration information sent by the access network device.

In some embodiments, the RRC diversity configuration information includes: an enable indication and a diversity threshold, or a disable indication. The enable indication is used for indicating s the terminal to enable/disable the RRC diversity, and the diversity threshold is used for indicating a threshold value of the channel quality when the terminal enables the RRC diversity.

In some embodiments, the RRC diversity configuration information is carried in an RRC connection reconfiguration message for transmission. That is, the access network device transmits an RRC connection reconfiguration message carrying the RRC diversity configuration information to the terminal, and the terminal receives the RRC connection reconfiguration message.

In Step 303, the terminal determines whether to enable the RRC diversity according to the RRC diversity configuration information.

RRC diversity is a way of transmitting identical uplink RRC messages through at least two connections.

In some embodiments, the RRC diversity configuration information includes an enable indication and a diversity threshold. The terminal enables the RRC diversity according to the enable indication, and determines when to enable the RRC diversity and which connections to be enabled for the RRC diversity according to the diversity threshold.

In some embodiments, the RRC diversity configuration information includes a disable indication, based on which the terminal disables the RRC diversity.

In some embodiments, after enabling the RRC diversity, the terminal makes multiple copies of the same RRC message at the PDCP layer and transmits them to the same access network device for mergence and reception through at least two connections. Alternatively, the multiple copies of the RRC message are transmitted to different access network devices through at least two connections, and then aggregated from the different access network devices into the same access network device, for mergence and reception.

In summary, according to the method for transmitting an RRC message provided by the present embodiment: by receiving the RRC diversity configuration information sent by the access network device, RRC diversity is determined to be enabled according to the RRC diversity configuration information. Since the terminal can transmit identical uplink RRC messages through at least two connections after the RRC diversity is enabled, the access network device merges the at least two identical uplink RRC messages received, which can solve the problems such as transmission failure and high bit error rate of the RRC message when the channel quality is poor if only one connection is used to transmit the RRC message in the related art. Thus, the effect of improving the success rate and reliability of transmitting the RRC message and reducing the bit error rate of the RRC message is achieved.

Figure 3B:
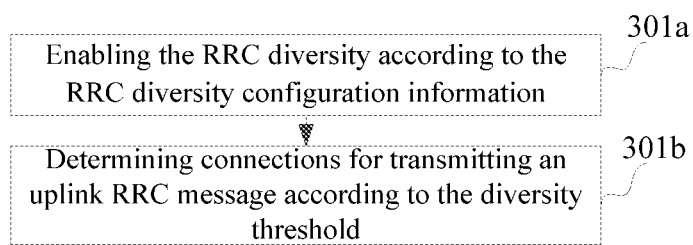
FIG. 3B is a flowchart of Step 303 in FIG. 3A shown according to an example.

In an alternative of the embodiment illustrated in FIG. 3A, the RRC diversity configuration information includes an enable indication and a diversity threshold. Step 303 can alternatively be implemented as Step 303a and Step 303b, as shown in FIG. 3B.

In Step 303a, the RRC diversity is enabled according to the enable indication.

The terminal enables the RRC diversity according to the enable indication.

In Step 303b, connections for transmitting an uplink RRC message is determined according to the diversity threshold.

In some embodiments, the diversity threshold includes: a first diversity threshold and/or a second diversity threshold, wherein the first diversity threshold is less than or equal to the second diversity threshold. The first diversity threshold is a threshold for indicating that the quality of the downlink channel is poor, and the second diversity threshold is a threshold for indicating that the quality of the downlink channel is good.

In some embodiments, the RRC diversity configuration information further includes a DU list including identifiers of DUs that support RRC diversity.

The identifiers of DUs that support RRC diversity is used to uniquely identify the DUs that support RRC diversity. Since one DU corresponds to a plurality of connections, if there is at least one connection that can support RRC diversity between the DU and the terminal, the DU is a DU supporting RRC diversity.

It should be noted that, there may be three different settings for the diversity threshold in the RRC diversity configuration information. That is, a first diversity threshold is set, or a first diversity threshold and a second diversity threshold are set simultaneously, or a second diversity threshold is set. Whether the RRC diversity configuration information carries a DU list includes two situations: the RRC diversity configuration information carries DU list or the RRC diversity configuration information does not carry a DU list. Therefore, the foregoing Step 303b includes at least six different implementations.

The six different implementations of the Step 303b are explained in conjunction with six specific embodiments hereinafter. The embodiments are illustrated by taking the access network device as at least two distribution units DU in the 5G communication system.

In the first implementation, the RRC diversity configuration information carries: an enable indication, a first diversity threshold, and a DU list that supports RRC diversity.

Figure 4A:
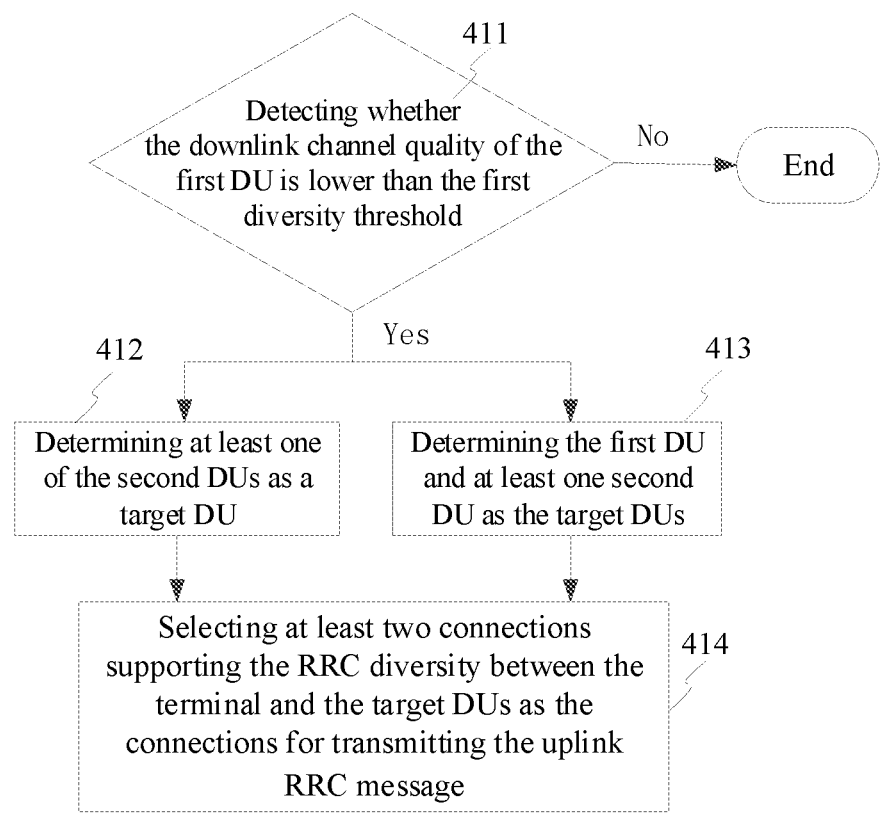
FIG. 4A is a flowchart of determining a way of determining connections for transmitting an uplink RRC message shown according to an example of the present disclosure.

FIG. 4A is a flowchart of a way of determining connections for transmitting an uplink RRC message shown according to an example of the present disclosure. In the present embodiment, Step 303b is alternatively implemented as Steps 411 to 414.

In Step 411, it is detected whether the downlink channel quality of the first DU is lower than the first diversity threshold.

The first DU is a DU that a primary serving cell corresponds to when the terminal establishes an initial connection. The initial connection is an RRC connection established between the terminal and the access network device for the first time. For example, if the terminal establishes an initial RRC connection with DU1, the first DU is DU1.

The downlink channel quality is the quality of the downlink channel for transmitting a downlink signal. In some embodiments, the terminal obtains the quality of the downlink channel by measuring the downlink reference signal in the downlink channel. Exemplarily, a Channel Quality Indicator (CQI) is used to measure the quality of the downlink channel.

In the present embodiment, the terminal needs to equivalently derive the uplink channel quality from the downlink channel quality, to judge the quality of the uplink channel for transmitting the uplink RRC message. In some embodiments, if Time Division Duplexing (TDD) technology is used between the terminal and the access network device, the downlink channel quality is approximately equal to the uplink channel quality according to channel reciprocity. If Frequency Division Duplexing (FDD) technology is used between the terminal and the access network device, the sum of the downlink channel quality and the correction value is approximately equal to the uplink channel quality, wherein the correction value is an empirical value set by technicians according to the frequency difference value between the uplink channel and the downlink channel. Therefore, when the downlink channel quality is measured and obtained by the terminal, the uplink channel quality can be calculated equivalently.

If the downlink channel quality of the first DU is lower than the first diversity threshold, proceed with Step 412 or Step 413.

If the downlink channel quality of the first DU is not lower than the first diversity threshold, the RRC diversity is not enabled temporally, and the process ends.

In Step 412, at least one of the second DUs is determined as a target DU.

The target DU is a DU that the connection for transmitting the uplink RRC message corresponds to, and the second DU is a DU that supports RRC diversity. In some embodiments, the terminal determines all the second DUs as the target DUs, or a portion of the second DUs as the target DUs, or the selected one of the second DUs as the target DU.

In an example, when detecting that the downlink channel quality of the first DU is lower than the first diversity threshold, the terminal determines all DUs in the DU list that support RRC diversity as the target DUs. For example, if the DUs in the DU list include DU3, the target DU is DU3.

In Step 413, the first DU and at least one second DU are determined as the target DUs.

What is different from Step 412 is that, the terminal simultaneously determines the first DU and at least one second DU as the target DUs.

In some embodiments, the terminal determines the first DU and all the second DUs as the target DUs; or the first DU and a portion of the second DUs as the target DUs; or the first DU and one second DU as the target DUs.

In another example, when detecting that the downlink channel quality of the first DU is lower than the first diversity threshold, the terminal determines the first DU and all the DUs supporting the RRC diversity as the DUs that the connections for transmitting the uplink RRC message correspond to. For example, the DUs in the DU list include DU3, the target DUs are DU1 and DU3.

In Step 414, at least two connections supporting the RRC diversity between the terminal and the target DUs are selected as the connections for transmitting the uplink RRC message.

The terminal determines the target DU first and then selects at least two target connections that support RRC diversity. The target connections are connections for transmitting an uplink RRC message during RRC diversity transmission.

In an example, the target DU is DU3, and the target connections are DU3+z1 and DU3+z2. In another example, the target DUs are DU1 and DU3, and the target connections are DU1+x2, DU3+z1, and DU3+z2.

In some embodiments, when there are two or more target DUs, each target DU corresponds to at least one target connection.

In some embodiments, the connection supporting RRC diversity includes at least one of: a signaling radio bearer, a radio bearer dedicated to RRC diversity, and a radio bearer that supports piggybacking transmission of an RRC message by multiplexing technology.

Figure 4B:
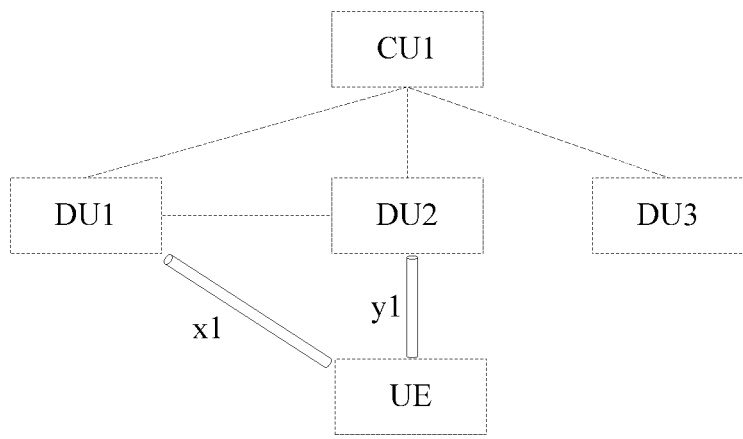
FIG. 4B is a schematic diagram of a terminal and target DU enabling RRC diversity shown according to an example of the present disclosure.

In a specific example, DU1 is a DU that the primary serving cell corresponds to when the terminal establishes an initial connection, that is, DU1 is the first DU, and DU2 is the DU supporting the RRC diversity. That is, DU2 is the second DU. When detecting that the downlink channel quality of DU1 is lower than the first diversity threshold, the terminal determines DU1 and DU2 as the target DUs. Referring to FIG. 4B, a schematic diagram of a terminal and target DU enabling RRC diversity is shown. The terminal is a UE, and both DU1 and DU2 are the DUs that support the RRC diversity. There exits one connection x1 between UE and DU1, and there exits one connection y1 between the UE and DU2. Both the connection x1 and the connection y1 are the connections supporting RRC diversity. The UE transmits the same RRC message through the connections x1 and y1, respectively. Since a communication connection is established between DU1 and DU2, when receiving the RRC message, DU2 may transmit the RRC message to DU1. DU1 merges and receive the two identical RRC messages received.

In summary, by setting a first diversity threshold, when the quality of the downlink channel between the terminal and the first DU is poor, the terminal can transmit identical uplink RRC messages through the connection between the terminal and the first DU and the connection between the terminal and the second DU. Thus, the success rate and reliability of transmitting the uplink RRC message can be improved and the bit error rate of the RRC message can be reduced.

In the second implementation, the RRC diversity configuration information carries: an enable indication, a second diversity threshold, and a DU list that supports RRC diversity.

Figure 4C:
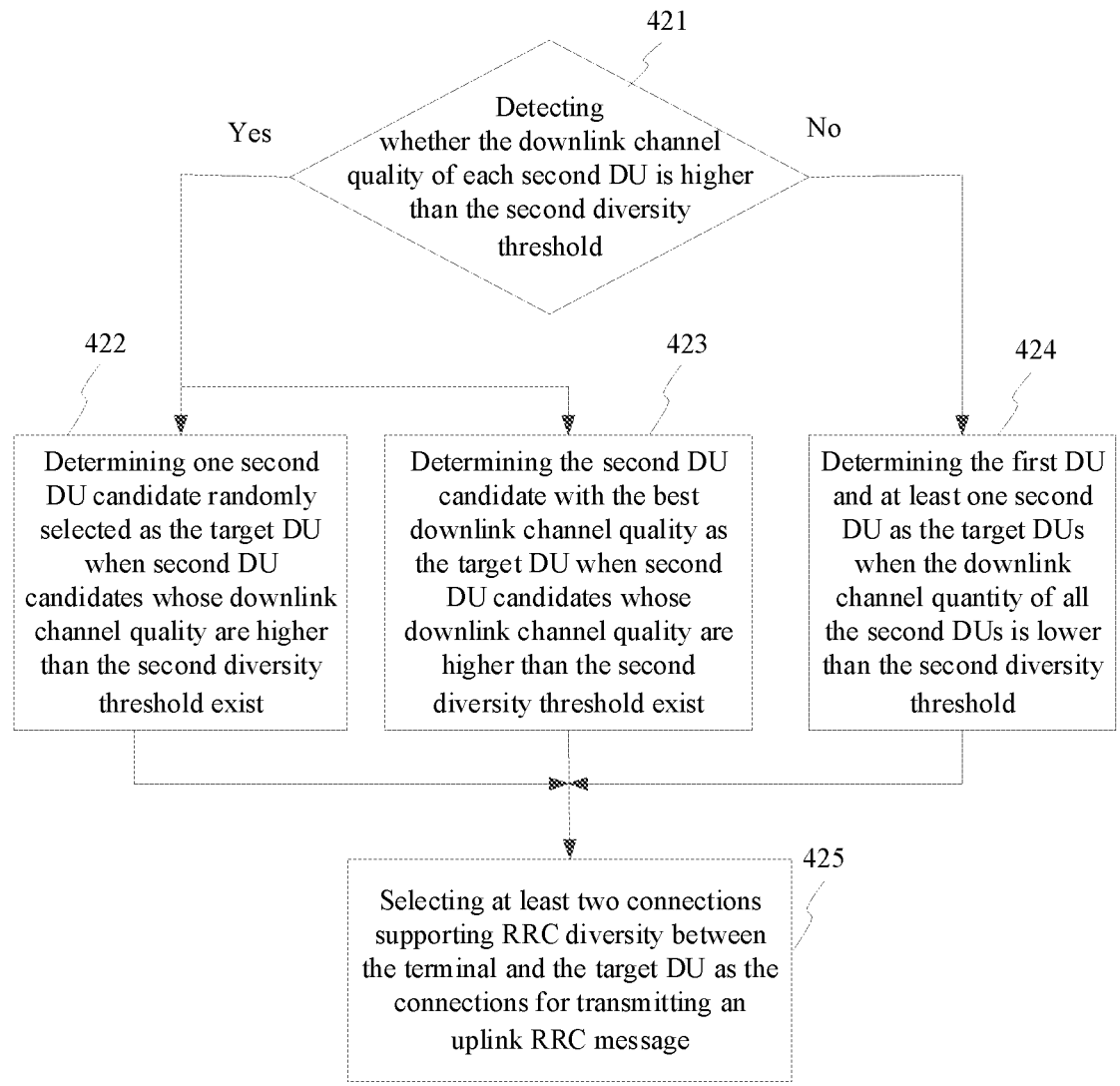
FIG. 4C is a flowchart of determining a way of determining connections for transmitting an uplink RRC message shown according to an example of the present disclosure.

FIG. 4C is a flowchart of a way of determining connections for transmitting an uplink RRC message shown according to an example of the present disclosure. In the present embodiment, Step 303b is alternatively implemented as Steps 421 to 425.

In Step 421, it is detected whether the downlink channel quality of each second DU is higher than the second diversity threshold, wherein the second DU is a DU the DU identifier in the DU list corresponds to.

In some embodiments, when a plurality of connections are established between the terminal and the same second DU, the downlink channel quality of the connection of the primary serving cell of the second DU is preferentially detected.

When a second DU whose downlink channel quality is higher than the second diversity threshold exits, proceed with Step 422 or 423. When a second DU whose downlink channel quality is not higher than the second diversity threshold exists, proceed with Step 424.

In Step 422, when second DU candidates whose downlink channel quality is higher than the second diversity threshold exist, one second DU candidate randomly selected is determined as the target DU.

In an example, when the detection result obtained by the terminal is that second DUs whose downlink channel quality is higher than the second diversity threshold exist, one second DU candidate is randomly selected from the second DU candidates whose downlink channel quality is higher than the second diversity threshold and is determined as the target DU.

In Step 423, when second DU candidates whose downlink channel quality is higher than the second diversity threshold exist, the second DU candidate with the best downlink channel quality is determined as the target DU.

As another parallel implementation of Step 422, if the detection result obtained by the terminal is that second DUs whose downlink channel quality is higher than the second diversity threshold exist, the second DU candidate with the best downlink channel quality, selected from the second DU candidates whose downlink channel quality is higher than the second diversity threshold, is determined as the target DU.

In Step 424, when the downlink channel quantity of all the second DUs is lower than the second diversity threshold, the first DU and at least one second DU are determined as the target DUs, wherein the first DU is a DU that the primary service cell corresponds to when the terminal establishes an initial connection.

In some embodiments, the terminal determines the first DU and all the second DUs as the target DUs; or the terminal determines the first DU and a portion of the second DUs as the target DUs; or the terminal determines the first DU and one second DU as the target DUs.

In Step 425, at least two connections supporting RRC diversity between the terminal and the target DU are selected as the connections for transmitting an uplink RRC message.

The terminal determines the target DU first and then selects at least two target connections that support RRC diversity. The target connections are connections for transmitting an uplink RRC message during RRC diversity transmission.

In some embodiments, when there are two or more target DUs, each target DU corresponds to at least one target connection.

In summary, by setting the second diversity threshold, the terminal randomly selects the DU with good or best downlink channel quality from the second DUs when the quality of the downlink channel between the terminal and the second DU is good, and transmits the identical uplink RRC messages through at least two connections with the second DU. Thus, the success rate and reliability of transmitting the uplink RRC message can be improved and the bit error rate of the RRC message can be reduced.

In the third implementation, the RRC diversity configuration information carries: an enable indication, a first diversity threshold, a second diversity threshold, and a DU list that supports RRC diversity.

Figure 4D:
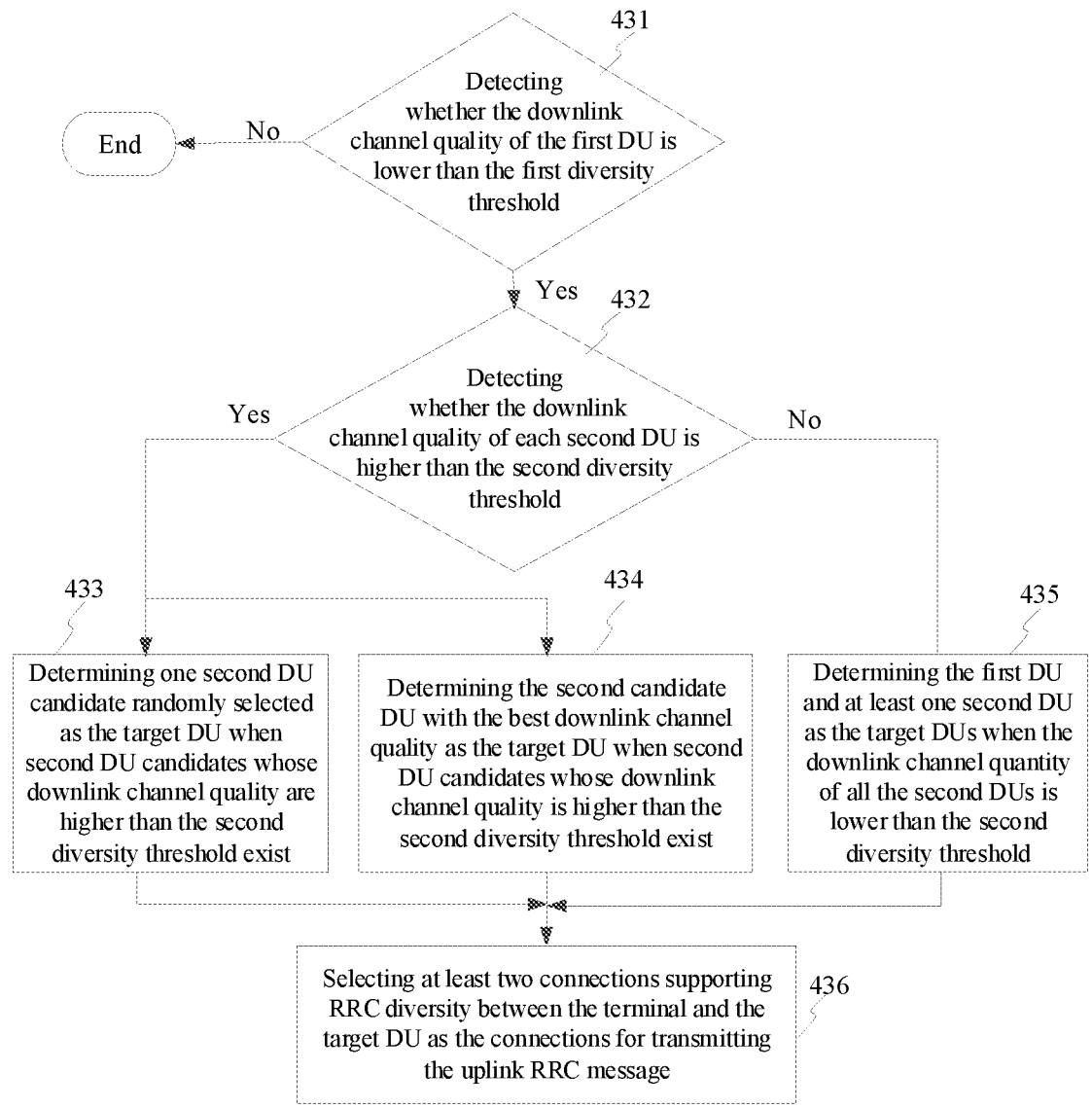
FIG. 4D is a flowchart of determining a way of determining connections for transmitting an uplink RRC message shown according to an example of the present disclosure.

FIG. 4D is a flowchart of a way of determining connections for transmitting an uplink RRC message shown according to an example of the present disclosure. In the present embodiment, Step 303b is alternatively implemented as Steps 431 to 436.

In Step 431, it is detected whether the downlink channel quality of the first DU is lower than the first diversity threshold, wherein the first DU is a DU that the primary serving cell corresponds to when the terminal establishes an initial connection.

When the downlink channel quality of the first DU is lower than the first diversity threshold, proceed with Step 432.

When the downlink channel quality of the first DU is not lower than the first diversity threshold, the RRC diversity is not enabled temporally, and the process ends.

In Step 432, when the downlink channel quality of the first DU is lower than the first diversity threshold, it is detected whether the downlink channel quality of each second DU is higher than the second diversity threshold.

In some embodiments, when a plurality of connections are established between the terminal and the same second DU, the downlink channel quality of the connection of the primary serving cell of the second DU is preferentially detected.

When second DU candidates whose downlink channel quality is higher than the second diversity threshold exist, proceed with Step 433 or Step 434. When the downlink channel quantity of all the second DUs is lower than the second diversity threshold, proceed with Step 435.

In Step 433, when second DU candidates whose downlink channel quality is higher than the second diversity threshold exist, one second DU candidate randomly selected is determined as the target DU.

In an example, when the detection result obtained by the terminal is that second DUs whose the downlink channel quality is higher than the second diversity threshold exist, one second DU candidate, randomly selected from the second DU candidates whose downlink channel quality is higher than the second diversity threshold, is determined as the target DU.

In Step 434, when second DU candidates whose downlink channel quality is higher than the second diversity threshold exist, the second DU candidate with the best downlink channel quality is determined as the target DU.

As another parallel implementation of Step 433, if the detection result obtained by the terminal is that second DUs whose downlink channel quality is higher than the second diversity threshold exist, the second DU candidate with the best downlink channel quality, selected from the second DU candidates whose downlink channel quality is higher than the second diversity threshold, is determined as the target DU.

In Step 435, when the downlink channel quantity of all the second DUs is lower than the second diversity threshold, the first DU and at least one second DU are determined as the target DUs.

In some embodiments, the terminal determines the first DU and all the second DUs as the target DUs; or the terminal determines the first DU and a portion of the second DUs as the target DUs; or the terminal determines the first DU and one second DU as the target DUs.

In Step 436, at least two connections supporting RRC diversity between the terminal and the target DU are selected as the connections for transmitting the uplink RRC message.

The terminal determines the target DU first and then selects at least two target connections that support RRC diversity. The target connections are connections for transmitting an uplink RRC message during RRC diversity transmission.

Alternatively, when there are two or more target DUs, each target DU corresponds to at least one target connection.

Figure 4E:
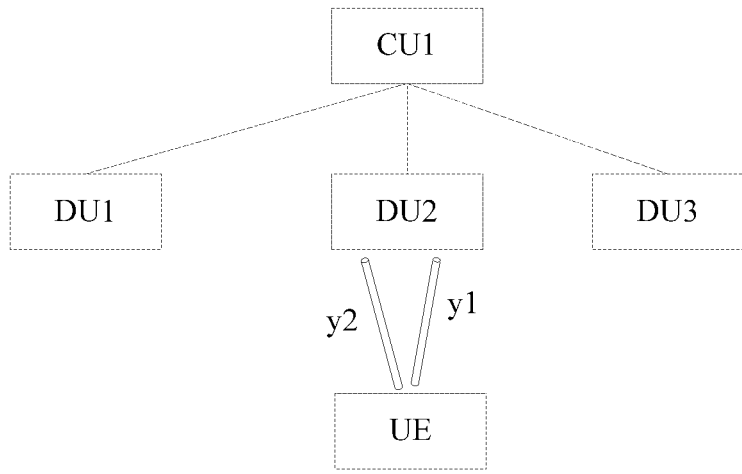
FIG. 4E is a schematic diagram of a terminal and target DU enabling RRC diversity shown according to another example of the present disclosure.

In a specific example, DU1 is a DU that the primary serving cell corresponds to when the terminal establishes an initial connection, that is, DU1 is the first DU, and the DU2 is the DU supporting RRC diversity. That is, the DU2 is the second DU. After detecting that the downlink channel quality of DU1 is lower than the first diversity threshold and the downlink channel quality of DU2 is higher than the second diversity threshold, the terminal determines the DU2 as the target DU. Referring to FIG. 4E, a schematic diagram of a terminal and target DU enabling RRC diversity is shown. The terminal is a UE, and DU2 is a DU that supports RRC diversity. There exists two connections y1 and y2 between the UE and DU2. Both connections y1 and y2 support RRC diversity. After determining that RRC diversity is enabled, the UE transmits the same RRC message to DU2 simultaneously through connections y1 and y2. After receiving the RRC message transmitted via connection y1 and the RRC message transmitted via the connection y2, DU2 mergers and receives the above two RRC messages.

In summary, by setting a first diversity threshold and a second diversity threshold, the terminal randomly selects the DU with good or the best downlink channel quality from the second DUs when the quality of the downlink channel between the terminal and the first DU is poor and the quality of the downlink channel between the terminal and the second DU is good, and transmits the identical uplink RRC messages through at least two connections with the second DU. Thus, the success rate and reliability of transmitting the uplink RRC message can be improved and the bit error rate of the RRC message can be reduced.

What is different from FIG. 4A to FIG. 4C is that, in the fourth to sixth implementations, since the access network device does not indicate the terminal a DU list supporting RRC diversity, the terminal takes all the DUs that support transmission of control plane messages as the DU list that supports RRC diversity. The DU supporting transmission of control plane messages is a DU between which and the terminal a connection supporting transmission of the control plane messages is established. The connection supporting transmission of the control plane message includes at least one of: a signaling radio bearer, a radio bearer dedicated to RRC diversity, and a radio bearer that supports piggybacking transmission of an RRC message by multiplexing technology.

In the fourth implementation, the RRC diversity configuration information carries: an enable indication and a first diversity threshold.

Figure 4F:
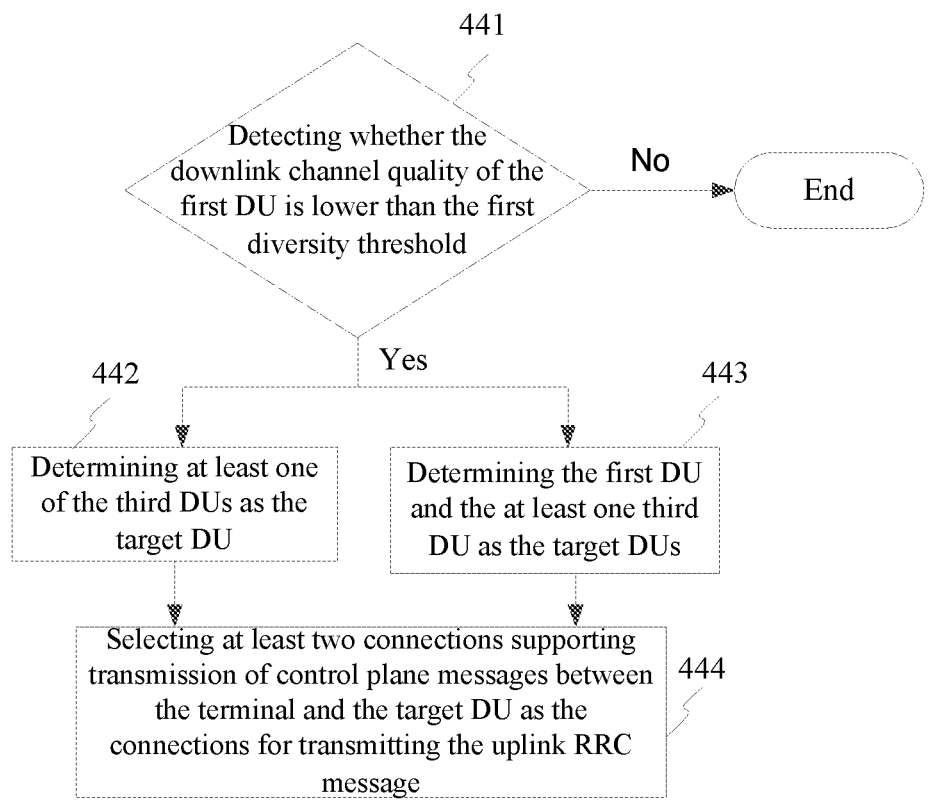
FIG. 4F is a flowchart of determining a way of determining connections for transmitting an uplink RRC message shown according to an example of the present disclosure.

FIG. 4F is a flowchart of a way of determining connections for transmitting an uplink RRC message shown according to an example of the present disclosure. In the present embodiment, Step 303b is alternatively implemented as Steps 441 to 444.

In Step 441, it is detected whether the downlink channel quality of the first DU is lower than the first diversity threshold, wherein the first DU is a DU that the primary serving cell corresponds to when the terminal establishes an initial connection.

When the downlink channel quality of the first DU is lower than the first diversity threshold, proceed with Step 442 or 443.

When the downlink channel quality of the first DU is not lower than the first diversity threshold, the RRC diversity is not enabled temporally, and the process ends.

In Step 442, at least one of the third DUs is determined as the target DU.

The third DU is a DU having a connection supporting transmission of a control plane message established with the terminal. The connection supporting transmission of the control plane message includes at least one of: a signaling radio bearer, a radio bearer dedicated to RRC diversity, and a radio bearer that supports piggybacking transmission of an RRC message by multiplexing technology.

For example, if a signaling radio bearer is established between the terminal and DU1, DU1 belongs to a third DU. For another example, if a radio bearer dedicated to the RRC diversity is established between the terminal and DU2, DU2 belongs to a third DU. For still another example, if a data radio bearer that supports piggybacking transmission of an RRC message by multiplexing technology is established between the terminal and DU4, DU4 belongs to a third DU.

In some embodiments, the terminal determines all the third DUs as the target DUs; or the terminal determines a portion of the third DUs as the target DUs; or the terminal determines one selected third DU as the target DU.

In Step 443, the first DU and the at least one third DU are determined as the target DUs.

As another parallel implementation of Step 442, the terminal simultaneously determines the first DU and the at least one third DU as the target DUs.

In some embodiments, the terminal determines the first DU and all the third DUs as the target DUs; or the terminal determines the first DU and a portion of the third DUs as the target DUs; or the terminal determines the first DU and one third DU as the target DUs.

In Step 444, at least two connections supporting transmission of control plane messages between the terminal and the target DU are selected as the connections for transmitting the uplink RRC message.

The terminal determines the target DU first, and then selects at least two target connections from the connections that support transmission of the control plane messages between the terminal and the target DU. The target connections are connections for transmitting an uplink RRC message during RRC diversity transmission.

In some embodiments, when there are two or more target DUs, each target DU corresponds to at least one target connection.

In summary, by setting a first diversity threshold, when the quality of the downlink channel of the first DU is poor, the terminal can cooperatively transmit the identical uplink RRC messages through the connection with the first DU and the connection with the third DU. Thus, the success rate and reliability of transmitting the uplink RRC message may can improved and the bit error rate of the RRC message can be reduced. In the fifth implementation, the RRC diversity configuration information carries: an enable indication and a second diversity threshold.

Figure 4G:
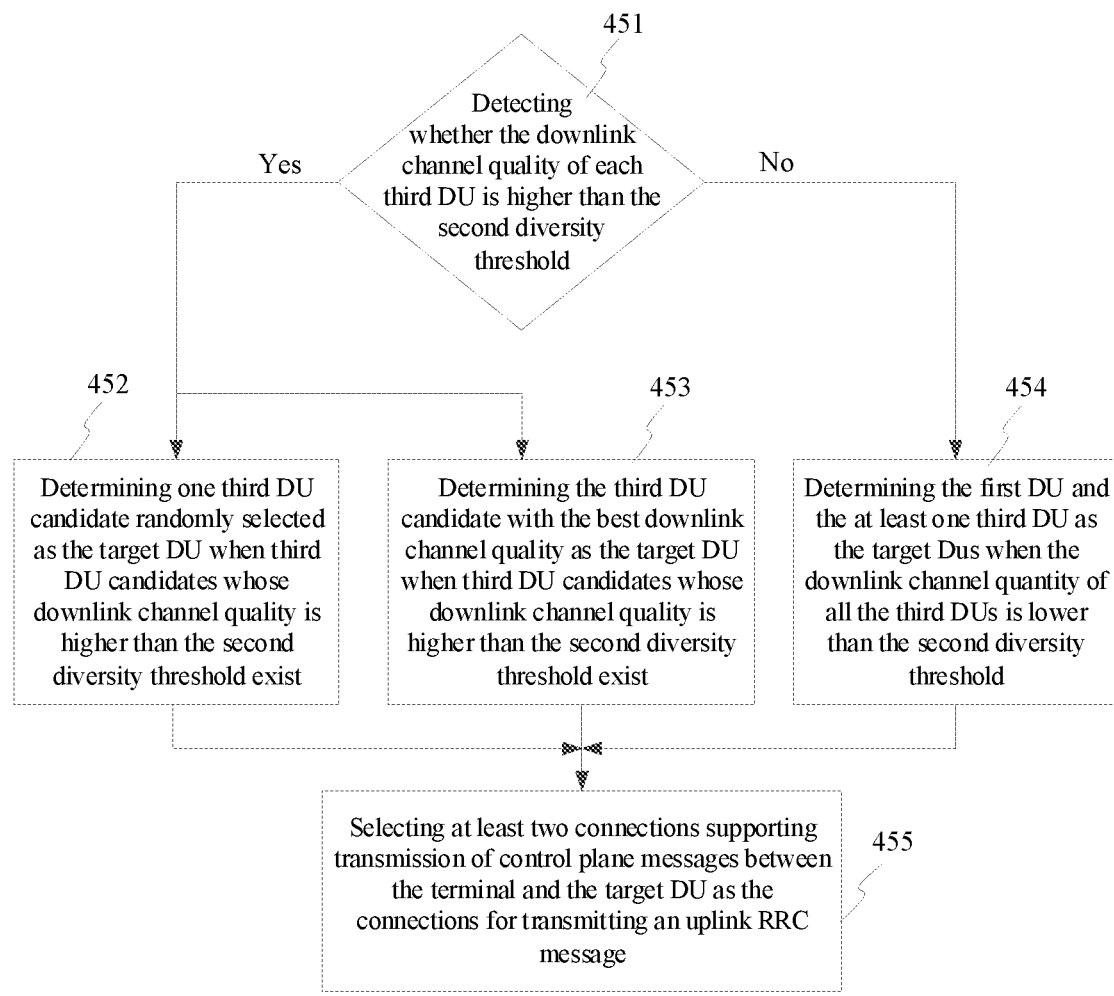
FIG. 4G is a flowchart of determining a way of determining connections for transmitting an uplink RRC message shown according to an example of the present disclosure.

FIG. 4G is a flowchart of a way of determining connections for transmitting an uplink RRC message shown according to an example of the present disclosure. In the present embodiment, Step 303b is alternatively implemented as Steps 451 to 455.

In Step 451, it is detected whether the downlink channel quality of each third DU is higher than the second diversity threshold, wherein the third DU is a DU that supports transmission of a control plane message.

In some embodiments, when a plurality of connections are established between the terminal and the same third DU, the downlink channel quality of the connection of the primary serving cell of the third DU is preferentially detected.

When the downlink channel quality of a third DU is higher than the second diversity threshold, proceed with Step 452 or 453. When the downlink channel quantity of all the third DUs is lower than the second diversity threshold, proceed with Step 454.

In Step 452, when third DU candidates whose downlink channel quality is higher than the second diversity threshold exist, one third DU candidate randomly selected is determined as the target DU.

In an example, if the detection result obtained by the terminal is that third DUs whose downlink channel quality is higher than the second diversity threshold exist, one third DU candidate, randomly selected from the third DU candidates whose downlink channel quality is higher than the second diversity threshold, is determined as the target DU.

In Step 453, when third DU candidates whose downlink channel quality is higher than the second diversity threshold exist, the third DU candidate with the best downlink channel quality is determined as the target DU.

As another parallel implementation of Step 452, if the detection result obtained by the terminal is that third DUs whose downlink channel quality is higher than the second diversity threshold exist, the third DU candidate with the best downlink channel quality, selected from the third DU candidates whose downlink channel quality is higher than the second diversity threshold, is determined as the target DU.

In Step 454, when the downlink channel quantity of all the third DUs is lower than the second diversity threshold, the first DU and the at least one third DU are determined as the target DUs.

The first DU is a DU that the primary serving cell corresponds to when the terminal establishes an initial connection.

In some embodiments, the terminal determines the first DU and all the third DUs as the target DUs; or the terminal determines the first DU and a portion of the third DUs as the target DUs; or the terminal determines the first DU and one third DU as the target DUs.

In Step 455, at least two connections supporting transmission of control plane messages between the terminal and the target DU are selected as the connections for transmitting an uplink RRC message.

The terminal determines the target DU first, and then selects at least two target connections from the connections supporting transmission of control plane messages between the terminal and the target DU. The target connections are connections for transmitting an uplink RRC message during RRC diversity transmission.

In some embodiments, when there are two or more target DUs, each target DU corresponds to at least one target connection.

In summary, by setting a second diversity threshold, when the quality of the downlink channel of the third DU is good, the terminal can randomly select the DU with good or the best downlink channel quality from the third DUs and transmit the identical uplink RRC messages through at least two connections with the third DU. Thus, the success rate and reliability of transmitting the uplink RRC message can be improved and the bit error rate of the RRC message can be reduced.

In the sixth implementation, the RRC diversity configuration information carries: an enable indication, a first diversity threshold, and a second diversity threshold.

Figure 4H:
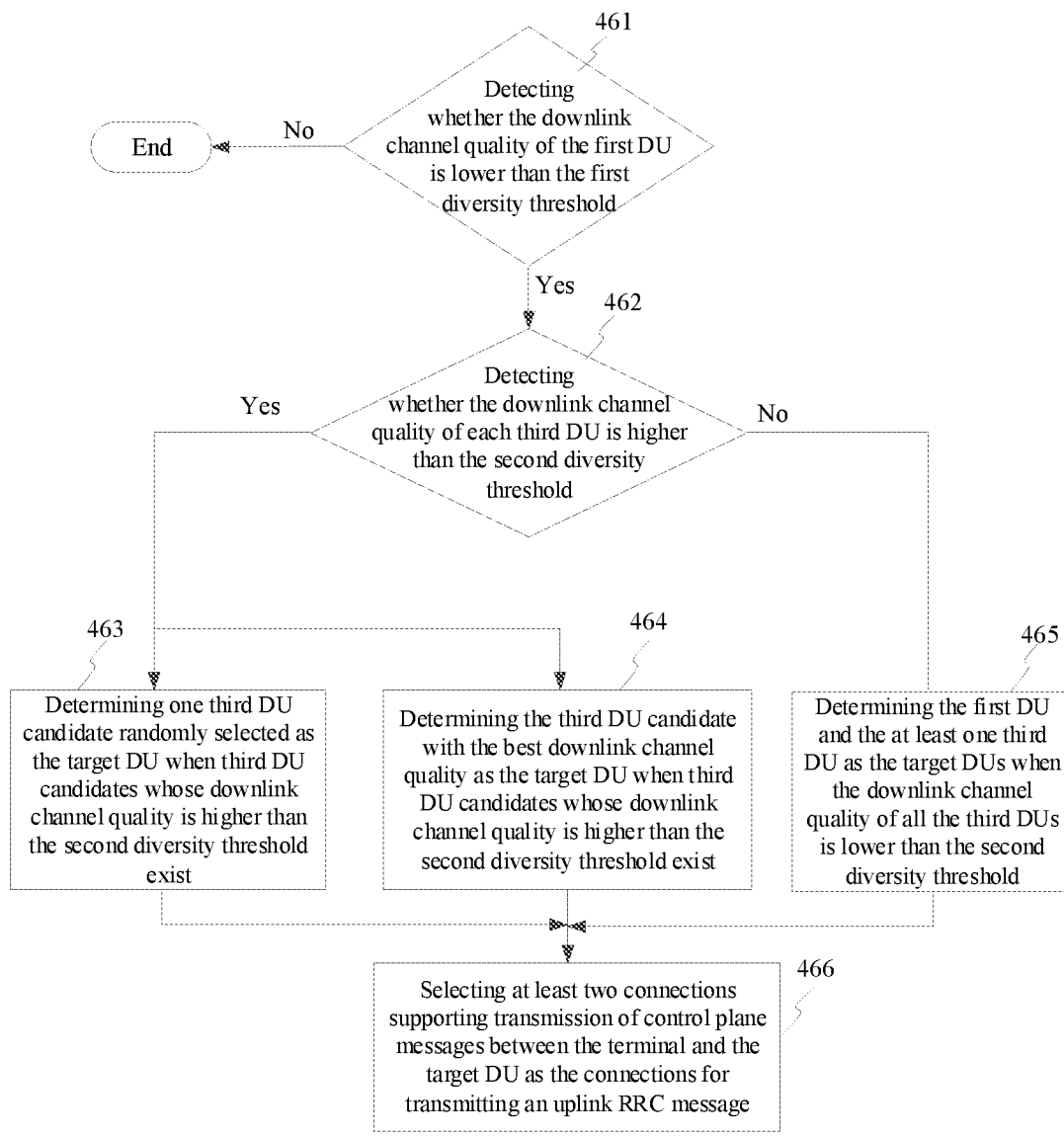
FIG. 4H is a flowchart of determining a way of determining connections for transmitting an uplink RRC message shown according to an example of the present disclosure.

FIG. 4H is a flowchart of a way of determining connections for transmitting an uplink RRC message shown according to an example of the present disclosure. In the present embodiment, Step 303b is alternatively implemented as Steps 461 to 466.

In Step 461, it is detected whether the downlink channel quality of the first DU is lower than the first diversity threshold, where the first DU is a DU that the primary serving cell corresponds to when the terminal establishes an initial connection.

When the downlink channel quality of the first DU is lower than the first diversity threshold, proceed with Step 462.

When the downlink channel quality of the first DU is not lower than the first diversity threshold, the RRC diversity is not enabled temporally, and the process ends.

In Step 462, when the downlink channel quality of the first DU is lower than the first diversity threshold, it is detected whether the downlink channel quality of each third DU is higher than the second diversity threshold.

In some embodiments, when a plurality of connections are established between the terminal and the same third DU, the downlink channel quality of the connection of the primary serving cell of the third DU is preferentially detected.

When third DU candidates whose downlink channel quality is higher than the second diversity threshold exist, proceed with Step 463 or 464. When the downlink channel quantity of all the third DUs is lower than the second diversity threshold, proceed with Step 465.

In Step 463, when third DU candidates whose downlink channel quality is higher than the second diversity threshold exist, one third DU candidate randomly selected is determined as the target DU.

In an example, if the detection result obtained by the terminal is that third DUs whose downlink channel quality is higher than the second diversity threshold exist, one third DU candidate, randomly selected from the third DU candidates whose downlink channel quality is higher than the second diversity threshold, is determined as the target DU.

In Step 464, when third DU candidates whose downlink channel quality is higher than the second diversity threshold exist, the third DU candidate with the best downlink channel quality is determined as the target DU.

As another parallel implementation of Step 463, if the detection result obtained by the terminal is that third DUs whose downlink channel quality is higher than the second diversity threshold exist, the third DU candidate with the best downlink channel quality, selected from the third DU candidates whose downlink channel quality is higher than the second diversity threshold, is determined as the target DU.

In Step 465, when the downlink channel quality of all the third DUs is lower than the second diversity threshold, the first DU and the at least one third DU are determined as the target DUs.

In some embodiments, the terminal determines the first DU and all the third DUs as the target DUs; or the terminal determines the first DU and a portion of the third DU as the target DUs; or the terminal determines the first DU and one third DU as the target DUs.

In Step 466, at least two connections supporting transmission of control plane messages between the terminal and the target DU are selected as the connections for transmitting an uplink RRC message.

The terminal determines the target DU first, and then selects at least two target connections from connections supporting transmission of control plane messages between the terminal and the target DU. The target connections are connections for transmitting an uplink RRC message during RRC diversity transmission.

In some embodiments, when there are two or more target DUs, each target DU corresponds to at least one target connection.

In summary, by setting a first diversity threshold and a second diversity threshold, when the quality of the downlink channel between the terminal and the first DU is poor and the quality of the downlink channel between the terminal and the third DU is good, the terminal can randomly select the DU with good or the best downlink channel quality from the third DUs and transmit the identical uplink RRC messages through at least two connections with the third DU. Thus, the success rate and reliability of transmitting the uplink RRC message can be improved and the bit error rate of the RRC message can be reduced.

In an alternative embodiment of any one of the embodiments illustrated in FIG. 3A, FIG. 3B, and FIG. 4A to FIG. 4F, the RRC diversity configuration information further carries: a maximum diversity number n, where the maximum diversity number n is used to indicate to the terminal the maximum number of connections used in the RRC diversity process.

Figure 5:
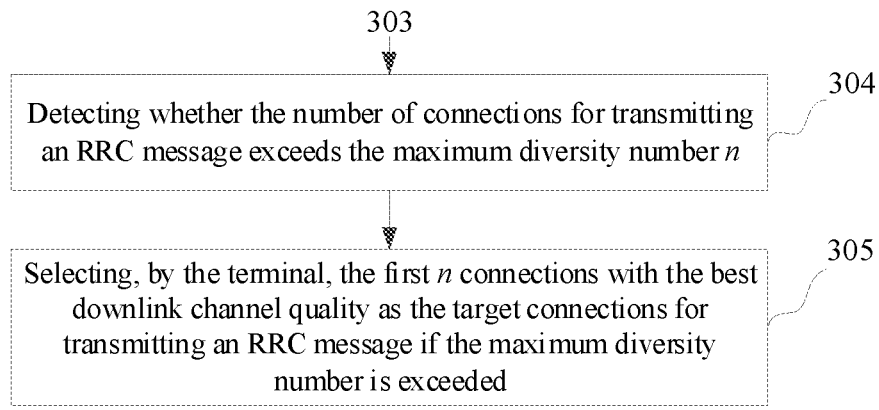
FIG. 5 is a flowchart of a method for transmitting an RRC message shown according to another example.

In combination with FIG. 5, subsequent to Step 303 (or Step 303b, Step 414, Step 425, Step 436, Step 444, Step 455, Step 466), the terminal may also perform the following Steps.

In Step 304, the terminal detects whether the number of connections for transmitting an RRC message exceeds the maximum diversity number n.

The maximum diversity number is indicative of the maximum number of connections that can be adopted when the terminal transmits the same uplink RRC message with RRC diversity. For example, the maximum diversity number is 2, or 3, or 4, or other values.

If the maximum diversity number n is exceeded, proceed with Step 305. If the maximum diversity number n is not exceeded, normal RRC diversity transmission is performed.

In Step 305, if the maximum diversity number is exceeded, the terminal selects the first n connections with the best downlink channel quality as the target connections for transmitting an RRC message.

When detecting the number of connections for transmitting an RRC message exceeds the maximum diversity number, the terminal selects the first n connections with the best downlink channel quality as the target connections for transmitting the RRC messages, where n may be less than or equal to the maximum diversity number.

The number of connections for transmitting an RRC message is limited by the maximum diversity number. Under the condition of ensuring the success rate of transmitting the RRC message and reducing the bit error rate of the RRC message, the processing overhead of the terminal and the access network device is reduced, the connection resources of the terminal and the access network device are saved, and the utilization ratio of the connections is improved.

In the foregoing embodiments, after the RRC diversity configuration information is transmitted from the access network device to the terminal, the terminal determines the target DU and the target connections by itself according to the RRC diversity configuration information. As another implementation, the target DU and the target connection can be determined by the access network device according to the uplink channel quality, and the access network device directly indicates the target DU and the target connections to the terminal in the RRC diversity configuration information, and there is no need for the terminal to determine the target DU and the target connection by itself. Please refer to the embodiments described below.

Figure 6:
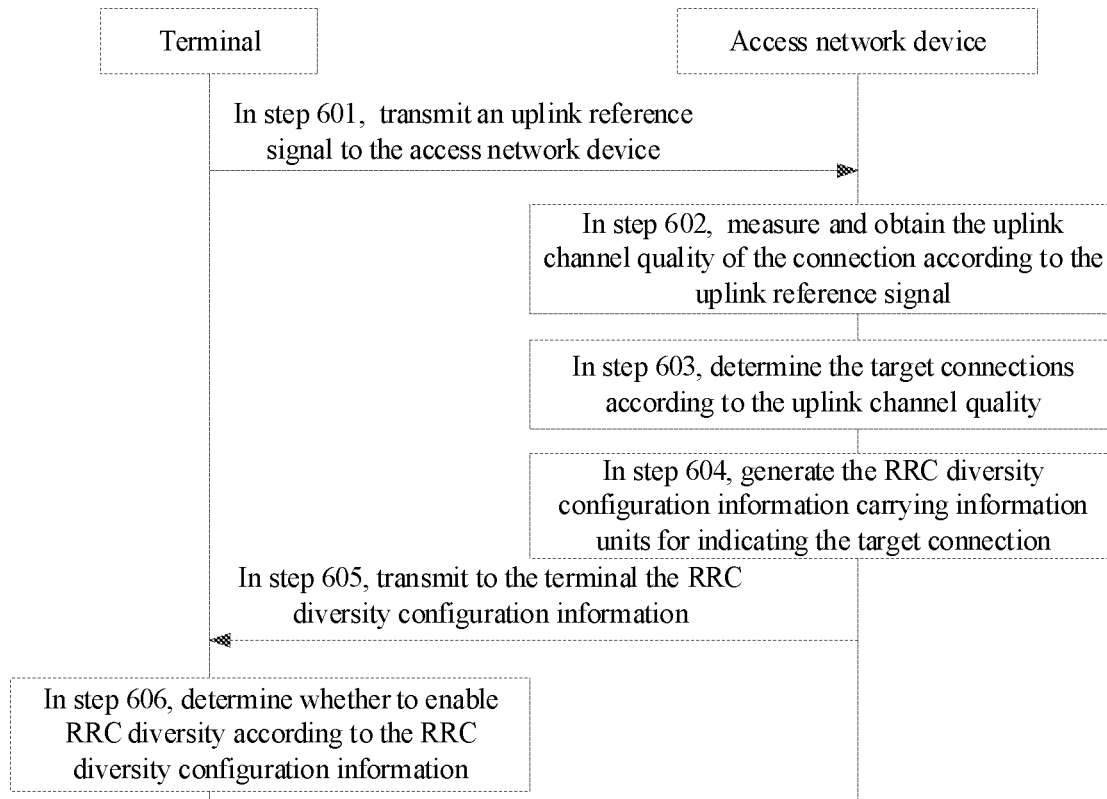
FIG. 6 is a flowchart of a method for transmitting an RRC message shown according to another example.

FIG. 6 is a flowchart of a method for transmitting an RRC message shown according to another example of the present disclosure. This embodiment is illustrated by applying the method to the communication system shown in FIG. 1. The method may include the following steps.

In Step 601, the terminal transmits an uplink reference signal to the access network device.

The terminal transmits an uplink reference signal to the access network device through a control channel or a data channel. The uplink reference signal is used to estimate or measure the quality of the uplink channel. The uplink reference signal may be a Demodulated Reference Signal (DRS) or a Sounding Reference Signal (SRS).

Correspondingly, the access network device receives the uplink reference signal transmitted by the terminal.

In Step 602, the uplink channel quality of the connection is measured and obtained by the access network device according to the uplink reference signal.

In Step 603, the access network device determines the target connections according to the uplink channel quality.

In some embodiments, the access network device determines the target DUs and the target radio links according to the diversity threshold and the uplink channel quantity of respective radio links. The determining process is similar to the process of determining, by the terminal, the target DUs and the target radio links according to the diversity threshold and the downlink channel quality (equivalent to the uplink channel quality) as shown in FIGS. 4A to 4F. The way of how the access network device determines the target DUs and the target radio links according to the diversity threshold and the uplink channel quality of respective radio links is not limited by the embodiments of the present disclosure.

When the radio links correspond to different access network devices, the uplink channel quantity of the radio links corresponding to respective access network devices may be measured by the access network devices, respectively, and then aggregated into the same access network device to perform the determining process. For example, after the DUs measure and obtain the uplink channel quantity of the radio links corresponding to respective DUs, the DUs aggregate the uplink channel quantity of the respective radio links into the first DU. The first DU is a DU when the terminal establishes an initial RRC connection.

The target connections are connections for transmitting an uplink RRC message after the terminal enables RRC diversity.

In Step 604, the access network device generates the RRC diversity configuration information carrying information units for indicating the target connection.

The information unit is usually a field that contains information to indicate the target connection. For example, the information to indicate the target connection is an identifier of the target connection. For another example, the information to indicate the target connection is any other information that can uniquely identify the target connection.

In some embodiments, the RRC diversity configuration information further carries an enable indication indicating the terminal to enable the RRC diversity configuration information.

In Step 605, the access network device transmits to the terminal the RRC diversity configuration information including an enable indication and an information unit for indicating the target connection.

Correspondingly, the terminal receives the RRC diversity configuration information transmitted by the access network device.

In some embodiments, the access network device transmits to the terminal an RRC connection reconfiguration message that carries the RRC diversity configuration information, and the terminal receives the RRC connection reconfiguration message transmitted by the access network device.

In Step 606, the terminal determines whether to enable RRC diversity according to the RRC diversity configuration information.

In one example, Step 606 includes the following two sub-steps.

In Sub-Step 1: the RRC diversity is enabled according to the enable indication.

In Sub-Step 2: the connection for transmitting the uplink RRC message is determined according to the information unit for indicating the target connection.

In summary, the target DUs and the target connections are determined by the access network device, and the RRC diversity configuration information including the identifier of the target access network device and the identifier of the target connection is directly transmitted to the terminal, so that the terminal can directly enable the RRC diversity according to the RRC diversity configuration information and acquire the target DUs and the target connections during RRC diversity. There is no need for the terminal to determine the target DUs and the target connections by itself, which saves the processing resources of the terminal and simplifies the processing logic of the terminal.

Respective embodiments described above are all illustrated by implementing RRC diversity in the communication system shown in FIG. 1. In addition, the present disclosure also provides embodiments for implementing RRC diversity in a heterogeneous communication system: implementing interworking RRC diversity between a 5G communication system and an LTE communication system, or interworking RRC diversity between a 5G communication system and a WLAN communication system, or interworking RRC diversity among a 5G communication system, an LTE communication system and a WLAN communication system. Please refer to the embodiments described below.

Figure 7A:
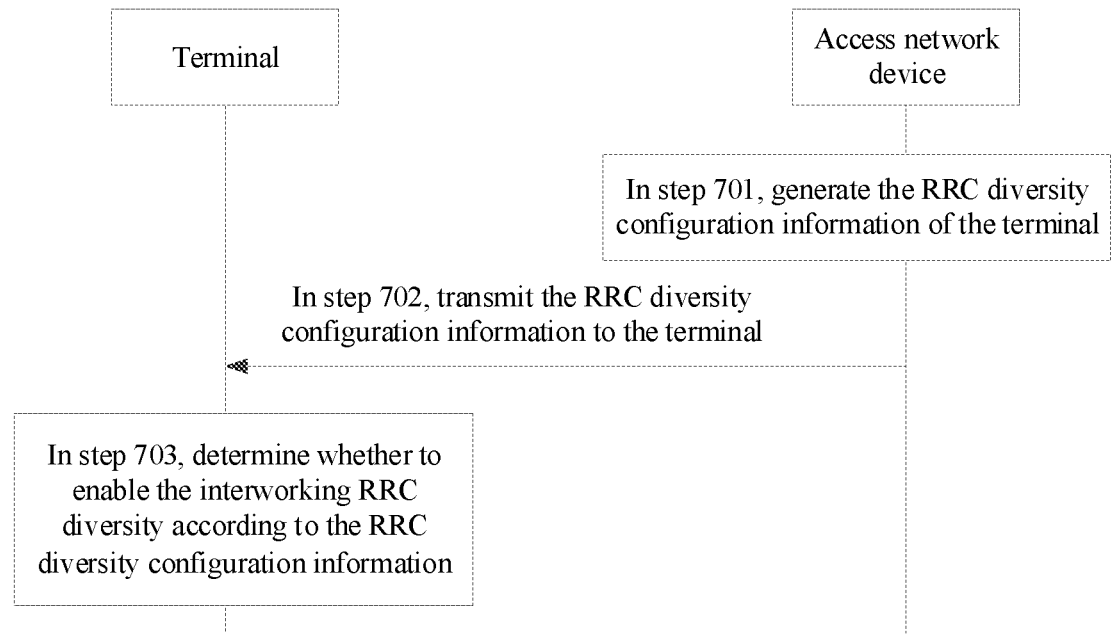
FIG. 7A is a flowchart of a method for transmitting an RRC message shown according to another example.

FIG. 7A is a flowchart of a method for transmitting an RRC message shown according to an example of the present disclosure. This embodiment is illustrated by applying the method to the heterogeneous communication system shown in FIG. 2. The method may include the following steps.

In Step 701, the access network device generates the RRC diversity configuration information of the terminal.

In some embodiments, since different types of access network devices, such as the first access network device and the second access network device, are included in a heterogeneous communication system, the RRC diversity configuration information needs to be generation cooperatively by different access network devices.

Illustratively, the first access network device is a DU in a 5G communication system, and the second access network device is an LTE in an LTE communication system. The RRC diversity configuration information of the terminal is cooperatively generated by the DU and the LTE.

In Step 702, the access network device transmits the RRC diversity configuration information to the terminal.

Correspondingly, the terminal receives the RRC diversity configuration information transmitted by the access network device. In some embodiments, the access network device transmits to the terminal an RRC connection reconfiguration message that carries the RRC diversity configuration information. The terminal receives the RRC connection reconfiguration message transmitted by the access network device.

In some embodiments, the access network device that transmits the RRC connection reconfiguration message to the terminal is the first access network device or the second access network device. Generally, if the first access network device is the access network device when the terminal establishes an initial RRC connection, the RRC connection reconfiguration message is transmitted to the terminal by the first access network device.

In some embodiments, the RRC diversity configuration information includes an indication of enabling interworking RRC diversity and a diversity threshold; or the RRC diversity configuration information includes an indication of disabling interworking RRC diversity.

The interworking RRC diversity refers to implementing RRC diversity between different communication systems. In other words, the interworking RRC diversity is a way of transmitting, by the terminal, the identical uplink RRC messages through at least two connections corresponding to at least two access network devices in different communication systems. The indication of interworking RRC diversity is used to indicate the terminal to enable/disable the interworking RRC diversity.

In Step 703, the terminal determines whether to enable the interworking RRC diversity according to the RRC diversity configuration information.

In some embodiments, the RRC diversity configuration information includes an indication of enabling interworking RRC diversity and a diversity threshold. The terminal enables the interworking RRC diversity according to the indication of enabling interworking RRC diversity, and determines when to enable the interworking RRC diversity and which connections are to be enabled for interworking RRC diversity according to the diversity threshold.

In some embodiments, the RRC diversity configuration information includes an indication of disabling the interworking RRC diversity. The terminal disables the interworking RRC diversity according to the disable indication.

In some embodiments, after enabling the interworking RRC diversity, the terminal makes multiple copies of the same RRC message at the PDCP layer and transmits them to at least two access network devices in different communication systems through at least two connections. The multiple copies of the same RRC message are then aggregated from the different access network devices into the same access network device, for mergence and reception.

In summary, according to the method for transmitting an RRC message provided by the present embodiment, by receiving the RRC diversity configuration information sent by the access network device, the interworking RRC diversity is determined to be enabled according to the RRC diversity configuration information. The terminal can transmit the identical uplink RRC messages via at least two connections belonging to different communication systems after the interworking RRC diversity is enabled, and the access network device merges the at least two identical uplink RRC messages received, which can solve the problems, such as transmission failure and high bit error rate of the RRC message, caused when the channel quality is poor in the case where only one connection is used to transmit the RRC messages in the related art, and achieve the effect of improving the success rate and reliability of transmitting the RRC message and reducing the bit error rate of the RRC message.

Figure 7B:
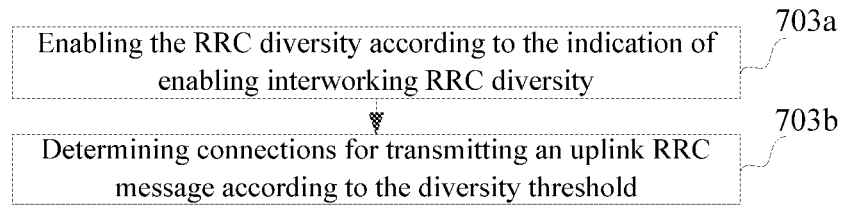
FIG. 7B is a flowchart of Step 703 in FIG. 7A shown according to an example.

In an alternative of the embodiment illustrated in FIG. 7A, the RRC diversity configuration information includes an indication of enabling interworking RRC diversity and a diversity threshold. Step 703 may alternatively be implemented as Step 703a and Step 703b, as shown in FIG. 7B.

In Step 703a, the RRC diversity is enabled according to the indication of enabling interworking RRC diversity.

The terminal enables the interworking RRC diversity according to the indication of enabling interworking RRC diversity. In some embodiments, the RRC configuration message further includes a disable indication. When the enable indication is a disable indication, the RRC diversity is disabled according to the enable indication.

In Step 703b, connections for transmitting an uplink RRC message is determined according to the diversity threshold.

In some embodiments, the diversity threshold includes a first diversity threshold and a second diversity threshold, wherein the first diversity threshold is less than or equal to the second diversity threshold. The first diversity threshold is a threshold for indicating that the quality of the downlink channel is poor, and the second diversity threshold is a threshold for indicating that the quality of the downlink channel is good.

In some embodiments, the diversity threshold includes a relative diversity threshold.

Since the diversity threshold in Step 703b includes two implementations, two different embodiments will be used for illustration below.

Figure 7C:
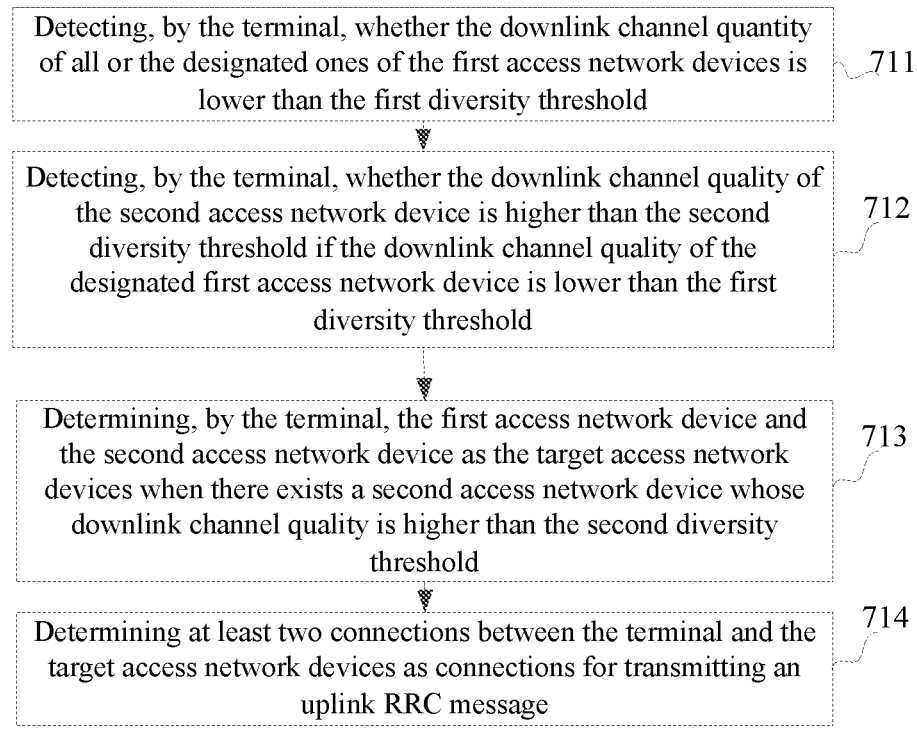
FIG. 7C is a flowchart of Step 703b in FIG. 7B shown according to an example.

In the first implementation, the RRC diversity configuration information includes an indication of enabling interworking RRC diversity, a first diversity threshold, and a second diversity threshold. In some embodiments, the RRC diversity configuration information further includes a list of identifiers of access network devices that support RRC diversity. In this case, Step 703b can be alternatively implemented as Step 711 to Step 717, as shown in FIG. 7C.

In Step 711, the terminal detects whether the downlink channel quantity of all or the designated ones of the first access network devices is lower than the first diversity threshold.

In some embodiments, the terminal detects whether the downlink channel quantity of all the first access network devices is lower than the first diversity threshold. The downlink channel quality refers to the downlink channel quality of the connections between the terminal and the first access network devices.

In some embodiments, the terminal detects whether the downlink channel quality of the designated first access network devices is lower than the first diversity threshold, wherein the designated first access network devices refer to the first access network devices when the terminal establishes an initial connection or the first access network devices that support RRC diversity.

In one example, the first access network device is a DU in a 5G communication system.

In Step 712, if the downlink channel quality of the designated first access network device is lower than the first diversity threshold, the terminal detects whether the downlink channel quality of the second access network device is higher than the second diversity threshold.

In some embodiments, the terminal detects whether the downlink channel quantity of all the second access network devices is higher than the second diversity threshold. The downlink channel quality refers to the downlink channel quality of the connections between the terminal and the second access network devices.

In some embodiments, the terminal detects whether the downlink channel quality of the designated second access network device is higher than the second diversity threshold, wherein the designated second access network device is the second access network device that supports RRC diversity.

In one example, the second access network device is an eNodeB in an LTE communication system.

In Step 713, when there exists a second access network device whose downlink channel quality is higher than the second diversity threshold, the terminal determines the first access network device and the second access network device as the target access network devices.

In Step 714, at least two connections between the terminal and the target access network devices are determined as connections for transmitting an uplink RRC message.

In some embodiments, the terminal determines at least two connections that support RRC diversity with the target access network device as the connections for transmitting an uplink RRC message; or the terminal determines at least two connections that support transmission of control plane messages with the target access network device as the connections for transmitting an uplink RRC message.

In some embodiments, each target access network device corresponds to at least one connection for transmitting an uplink RRC message. In other words, in at least two connections for transmitting an uplink RRC message, at least one connection corresponds to the first access network device, and at least one connection corresponds to the second access network device.

Figure 7D:
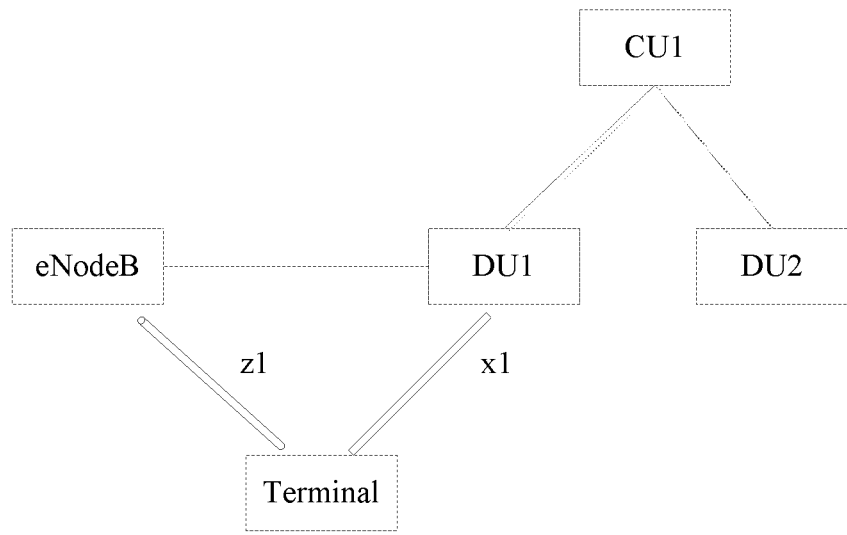
FIG. 7D is a schematic diagram of a terminal and target access network device enabling RRC diversity shown according to an example of the present disclosure.
Figure 7E:
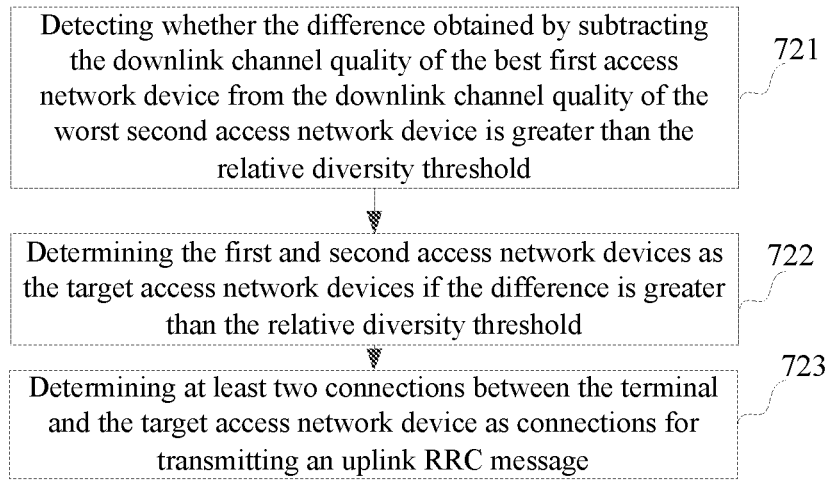
FIG. 7E is a flowchart of Step 703b in FIG. 7B shown according to an example.

In a specific example, the terminal is simultaneously applied in two different communication systems that are a 4G communication system and a 5G communication system respectively, wherein the first access network device is a DU, and the second access network is an eNodeB. When detecting that the downlink channel quality of the DU is lower than the first diversity threshold, and detecting that the downlink channel quality of the eNodeB is higher than the second diversity threshold, the terminal determines the DU and the eNodeB as the target access network devices. Referring to FIG. 7D, a schematic diagram of a terminal and target access network device enabling RRC diversity is shown. The terminal is a UE, and the DU and the eNodeB are both access network devices that support RRC diversity. There exists a connection x1 between the UE and DU1 in the DUs, and there exists a connection z1 between the UE and the eNodeB. The connection x1 and the connection z1 are both connections that support RRC diversity. The UE transmits the same RRC message through the connection x1 and the connection z1 simultaneously. Since a communication connection is established between the DU and the eNodeB, the eNodeB transmits an RRC message to the DU when receiving the RRC message, and then the RRC message received by the DU itself and the RRC message transmitted by the eNodeB are merged and received by the DU.

In summary, by setting a first diversity threshold and a second diversity threshold, when the quality of the downlink channel between the terminal and the first access network device is poor and the quality of the downlink channel between the terminal and the second access network device is good, the terminal can cooperatively transmit the identical uplink RRC messages through the connection with the first access network device and the connection with the second access network device. Thus, the success rate and reliability of transmitting the uplink RRC message can be improved and the bit error rate of the RRC message can be reduced.

In the second implementation, the RRC diversity configuration information includes an indication of enabling interworking RRC diversity and a relative diversity threshold. In some embodiments, the RRC diversity configuration information further includes a list of identifiers of access network devices that support RRC diversity. In this case, Step 703b can be alternatively implemented as Step 721 to Step 723, as shown in FIG. 7D.

In Step 721, it is detected whether the difference obtained by subtracting the downlink channel quality of the best first access network device from the downlink channel quality of the worst second access network device is greater than the relative diversity threshold.

In some embodiments, the worst second access network device is a second access network device with the worst downlink channel quality that supports RRC diversity, or a second access network device with the worst downlink channel quality that supports transmission of control plane messages.

In some embodiments, the best first access network device is a first access network device when the terminal establishes an initial connection, or a first access network device with the best downlink channel quality that supports RRC diversity, or a first access network device with the best downlink channel quality that supports transmission of control plane messages.

In Step 722, if the difference is greater than the relative diversity threshold, the first and second access network devices are determined as the target access network devices.

In Step 723, at least two connections between the terminal and the target access network device are determined as connections for transmitting an uplink RRC message.

In some embodiments, the terminal determines at least two connections that support RRC diversity with the target access network device as the connections for transmitting an uplink RRC message; or the terminal determines at least two connections that support transmission of control plane messages with the target access network device as the connections for transmitting an uplink RRC message.

In some embodiments, each target access network device corresponds to at least one connection for transmitting an uplink RRC message. In other words, in at least two connections for transmitting an uplink RRC message, at least one connection corresponds to the first access network device, and at least one connection corresponds to the second access network device.

In summary, by setting a relative diversity threshold, when the downlink channel quality corresponding to the connection with the best downlink channel quality of the first communication system is lower than the downlink channel quality corresponding to the connection with the worst downlink channel quality of the second communication system, the identical uplink RRC messages can be cooperatively transmitted through the connection with the first access network device and the connection with the second access network device. Thus, the success rate and reliability of transmitting the uplink RRC message can be improved and the bit error rate of the RRC message can be reduced.

It should be noted that, the embodiments of FIG. 7A to FIG. 7D are illustrated by taking the first access network device as a DU in a 5G communication system, and the second access network device as an eNodeB in an LTE communication system. However, those skilled in the art may be aware that the first and/or second access network device may be access network devices in other communication systems. For example, the first access network device is a DU in a 5G communication system, and the second access network device is an AP in a WLAN communication system, which will not be repeated herein.

It should be noted that the RRC diversity configuration information in the embodiments of FIG. 7A to FIG. 7D may optionally includes a maximum diversity number n, and the terminal may further process the RRC diversity configuration information in the case of the maximum diversity number n, which may be made reference to FIG. 6, and will not be repeated herein, either.

It should be noted that the steps related to the terminal in the foregoing embodiments may be separately implemented as a method for transmitting an RRC message at the terminal side, and the steps related to the access network device can be separately implemented as a method for transmitting an RRC message at the access network device side.

The followings are apparatus embodiments which may be used to implement the method embodiments. For details which are not disclosed in the apparatus embodiments, reference may be made to the method embodiments.

Figure 8:
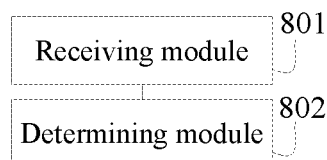
FIG. 8 is a block diagram of an apparatus for transmitting an RRC message shown according to an example.

FIG. 8 is a block diagram of an apparatus for transmitting an RRC message shown according to an example. The apparatus possesses the functions of implementing the above method examples. The functions may be implemented through hardware and may also be implemented through relevant software executed by hardware. The apparatus may include: a receiving module 801 and a determining module 802.

The receiving module 801 is configured to receive RRC diversity configuration information sent by the access network device, wherein the RRC diversity configuration information is configuration information required when the terminal enables or disables RRC diversity.

The determining module 802 is configured to determine whether to enable the RRC diversity according to the RRC diversity configuration information, wherein the RRC diversity is a way of transmitting identical uplink RRC messages through at least two connections.

In summary, according to the apparatus for transmitting an RRC message provided by the present embodiment, by receiving the RRC diversity configuration information sent by the access network device, RRC diversity is determined to be enabled or not according to the RRC diversity configuration information. Since the terminal can transmit identical uplink RRC messages through at least two connections after the RRC diversity is enabled, which solves the problems such as transmission failure and high bit error rate of the RRC message when the channel quality is poor if only one connection is used to transmit the RRC message in the related art. Thus, the success rate and reliability of transmitting the RRC message is improved and the bit error rate of the RRC message is reduced.

Figure 9:
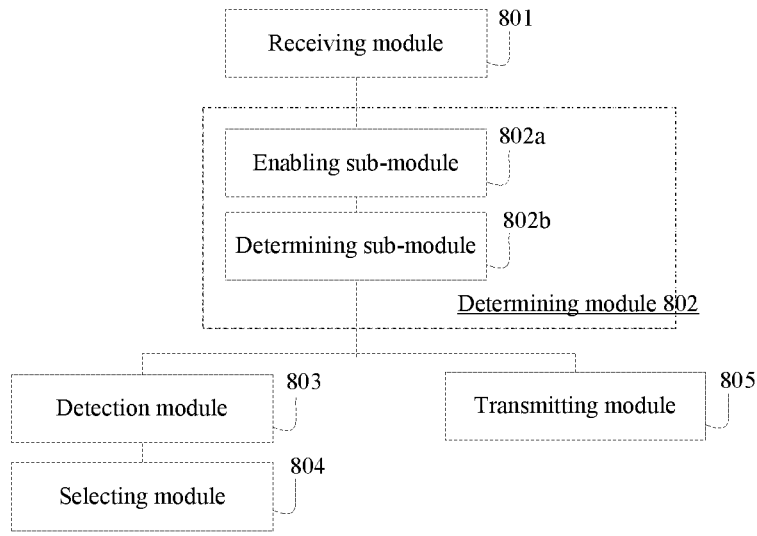
FIG. 9 is a block diagram of an apparatus for transmitting an RRC message shown according to another example.

In an optional embodiment of the embodiment shown in FIG. 8, the RRC diversity configuration information includes an enable indication and a diversity threshold. Referring to FIG. 9, the determining module 802 includes: an enabling sub-module 502a and a determining sub-module 802b.

The enabling sub-module 802a is configured to enable the RRC diversity according to the enable indication.

The determining sub-module 802b is configured to determine, according to the diversity threshold, connections for transmitting the uplink RRC message.

In some embodiments, the access network device includes at least two Distribution Units (DUs) in a 5G communication system, the diversity threshold includes a first diversity threshold, the RRC diversity configuration information further includes a DU list comprising identifiers of DUs that support RRC diversity.

The determining sub-module 802b is configured to: detect whether downlink channel quality of a first DU is lower than the first diversity threshold, wherein the first DU is a DU that a primary serving cell corresponds to when the terminal establishes an initial connection; when the downlink channel quality of the first DU is lower than the first diversity threshold, determine at least one of second DUs as a target DU, or determine the first DU and the at least one of second DUs as target DUs, wherein the second DUs are DUs that the DU identifier in the DU list corresponds to; and select at least two connections supporting the RRC diversity between the terminal and the target DUs as connections for transmitting the uplink RRC message.

In some embodiments, the diversity threshold further includes a second diversity threshold; and the determining sub-module 802b is configured to: detect whether downlink channel quality of each of the second DUs is higher than the second diversity threshold; and when second DU candidates whose downlink channel quality is higher than the second diversity threshold exist, determine one second DU candidate randomly selected as the target DU; or, detect whether downlink channel quality of each of the second DUs is higher than the second diversity threshold; and when second DU candidates whose downlink channel quality is higher than the second diversity threshold exist, determine the second DU candidate with the best downlink channel quality as the target DU.

In some embodiments, the diversity threshold further includes a second diversity threshold; and the determining sub-module 802b is configured to: detect whether downlink channel quality of each of the second DUs is higher than the second diversity threshold; and when the downlink channel quality of all the second DUs is lower than the second diversity threshold, determine the first DU and the at least one of the second DUs as the target DUs.

In some embodiments, the access network device includes at least two Distribution Units (Dus) in a 5G communication system; the diversity threshold includes a second diversity threshold; the RRC diversity configuration information further includes a DU list comprising identifiers of DUs that support RRC diversity; and the determining sub-module 802b is configured to: detect whether downlink channel quality of each of second DUs is higher than the second diversity threshold, wherein the second DUs are DUs that the DU identifiers in the DU list correspond to; when second DU candidates whose downlink channel quality is higher than the second diversity threshold exist, determine one second DU candidate randomly selected as a target DU, or determine the second DU candidate with the best downlink channel quality as the target DU; select at least two connections supporting the RRC diversity between the terminal and the target DU as connections for transmitting the uplink RRC message.

In some embodiments, the determining sub-module 802b is configured to: when downlink channel quality of all the second DUs is lower than the second diversity threshold, determine the first DU and the at least one of the second DUs as the target DUs, wherein the first DU is a DU that a primary serving cell corresponds to when the terminal establishes an initial connection.

In some embodiments, the access network device includes at least two Distribution Units (DUs) in a 5G communication system; the diversity threshold includes a first diversity threshold; and the determining sub-module 802b is configured to: detect whether downlink channel quality of a first DU is lower than the first diversity threshold, wherein the first DU is a DU that a primary serving cell corresponds to when the terminal establishes an initial connection; when the downlink channel quality of the first DU is lower than the first diversity threshold, determine at least one of third DUs as the target DU, or determine the first DU and the at least one of third DUs as the target DUs, wherein the third DUs are DUs that support transmission of control plane messages; and select at least two connections supporting transmission of control plane messages between the terminal and the target DUs as connections for transmitting the uplink RRC message.

In some embodiments, the diversity threshold further includes a second diversity threshold; and the determining sub-module 802b is configured to: detect whether downlink channel quality of each of the third DUs is higher than the second diversity threshold; and when third DU candidates whose downlink channel quality is higher than the second diversity threshold exist, determine one third DU candidate randomly selected as the target DU; or, detect whether downlink channel quality of each of the third DUs is higher than the second diversity threshold; and when third DU candidates whose downlink channel quality is higher than the second diversity threshold exist, determine the third DU candidate with the best downlink channel quality as the target DU.

In some embodiments, the diversity threshold further includes a second diversity threshold; and the determining sub-module 802b is configured to: detect whether downlink channel quality of each of the third DUs is higher than the second diversity threshold; and when the downlink channel quality of all the third DUs is lower than the second diversity threshold, determine the first DU and the at least one of the third DUs as the target DUs.

In some embodiments, the access network device includes at least two Distribution Units (Dus) in a 5G communication system; the diversity threshold includes a second diversity threshold; and the determining sub-module 802b is configured to: detect whether downlink channel quality of each of the third DUs is higher than the second diversity threshold, wherein the third DUs are DUs that support transmission of control plane messages; when third DU candidates whose downlink channel quality is higher than the second diversity threshold exist, determine one third DU candidate randomly selected as the target DU, or determine the third DU candidate with the best downlink channel quality as the target DU; and select at least two connections supporting transmission of control plane messages between the terminal and the target DU as connections for transmitting the uplink RRC message.

In some embodiments, the determining sub-module 802b is configured to: when the downlink channel quality of all the third DUs is lower than the second diversity threshold, determine the first DU and the at least one of the third DUs as the target DUs, wherein the first DU is a DU that a primary serving cell corresponds to when the terminal establishes an initial connection.

In an optional embodiment of the embodiment shown in FIG. 8, the RRC diversity configuration information includes a maximum diversity number n. Referring to FIG. 9, the apparatus further includes: a detection module 803 and a selecting module 804.

The detection module 803 is configured to detect whether the number of connections for transmitting the RRC message exceeds the maximum diversity number n.

The selecting module 804 is configured to, when the number of connections for transmitting the RRC message exceeds the maximum diversity number, select first n connections with the best downlink channel quality as target connections for transmitting the RRC message.

In an optional embodiment of the embodiment shown in FIG. 8, the RRC diversity configuration information includes an enable indication and an information unit for indicating a target connection. Referring to FIG. 9, the apparatus further includes: a transmitting module 805 configured to transmit an uplink reference signal to the access network device, wherein the uplink reference signal is used to measure uplink channel quality of the connections.

The determining module 802 includes: the enabling sub-module 802a configured to enable the RRC diversity according to the enable indication; and the determining sub-module 802b configured to determine, according to the information unit for indicating a target connection, connections for transmitting the uplink RRC message.

In some embodiments, the access network device includes: a first access network device of a first communication system and a second access network device of a second communication system, wherein the first access network device is connected to the second access network device. The RRC diversity configuration information includes an indication of enabling interworking RRC diversity and a diversity threshold. The determining sub-module 802b is configured to: enable, according to the indication of enabling interworking RRC diversity, interworking RRC diversity between the first access network device and the second access network device; and determine, according to the diversity threshold, connections for transmitting the uplink RRC message. The first communication system is one of a 5G communication system, an LTE communication system, and a WLAN communication system, and the second communication system is another one of a 5G communication system, an LTE communication system, and a WLAN communication system.

In some embodiments, the diversity threshold includes a first diversity threshold and a second diversity threshold; and the determining sub-module 802b is configured to: detect whether downlink channel quality of all or designated ones of the first access network devices is lower than the first diversity threshold, wherein the designated one of the first access network devices are first access network devices when the terminal establishes an initial connection, or first access network devices that support RRC diversity; when the downlink channel quality of all or designated ones of the first access network devices is lower than the first diversity threshold, detect whether downlink channel quality of the second access network device is higher than the second diversity threshold; when the downlink channel quality of the second access network device is higher than the second diversity threshold, determine the first access network devices and the second access network device as target access network devices; determine at least two connections between the terminal and the target access network devices as connections for transmitting the uplink RRC message.

In some embodiments, the diversity threshold comprises a relative diversity threshold; and the determining sub-module 802b is configured to: detect whether a difference obtained by subtracting the downlink channel quality of a best first access network device from the downlink channel quality of a worst second access network device is greater than the relative diversity threshold; when the difference is greater than the relative diversity threshold, determine the first and second access network device as target access network devices; and determine at least two connections between the terminal and the target access network devices as connections for transmitting the uplink RRC message. The best first access network device is a first access network device when the terminal establishes an initial connection, or a first access network device with the best downlink channel quality that supports RRC diversity, or a first access network device with the best downlink channel quality that supports transmission of control plane messages; and the worst second access network device is a second access network device with the worst downlink channel quality that supports RRC diversity, or a second access network device with the worst downlink channel quality that supports transmission of control plane messages.

In some embodiments, the RRC diversity configuration information comprises a disable indication; and the determining module 802b is configured to: disable the RRC diversity according to the disable indication.

In some embodiments, the receiving module 801 is configured to receive an RRC connection reconfiguration message sent by the access network device, wherein the RRC connection reconfiguration message carries the RRC diversity configuration information.

Figure 10:
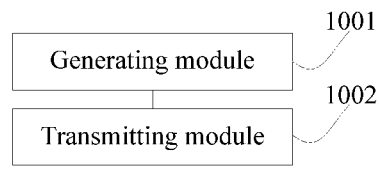
FIG. 10 is a block diagram of an apparatus for transmitting an RRC message shown according to another example.

FIG. 10 is a block diagram of an apparatus for transmitting an RRC message shown according to another example. The apparatus possesses the functions of implementing the above method examples. The functions may be implemented through hardware and may also be implemented through relevant software executed by hardware. The apparatus may include: a generating module 1001 and a transmitting module 1002.

The generating module 1001 is configured to generate RRC diversity configuration information of the terminal, wherein the RRC diversity configuration information is configuration information required when the terminal enables or disables RRC diversity.

The transmitting module 1002 is configured to transmit the RRC diversity configuration information to the terminal, wherein the RRC diversity configuration information is used for indicating the terminal whether or not to enable RRC diversity, and the RRC diversity is a way of transmitting identical uplink RRC messages through at least two connections.

In an optional embodiment of the embodiment shown in FIG. 10, the RRC diversity configuration information includes: an enable indication for indicating the terminal to enable the RRC diversity and a diversity threshold for determining a radio bearer for transmitting the uplink RRC message; or, a disable indication for indicating the terminal to disable the RRC diversity.

In some embodiments, the RRC diversity configuration information further includes a maximum diversity number n, wherein the maximum diversity number n is a maximum number of connections used when the terminal transmits the identical uplink RRC messages.

Figure 11:
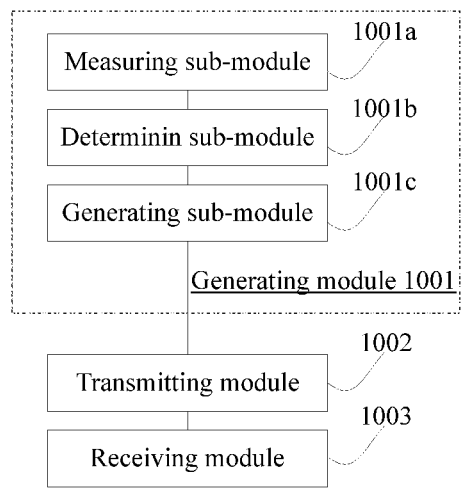
FIG. 11 is a block diagram of an apparatus for transmitting an RRC message shown according to another example.

In an optional embodiment of the embodiment shown in FIG. 10, the RRC diversity configuration information includes an enable indication and an information unit for indicating a target connection. Referring to FIG. 11, the apparatus further includes: a receiving module 1003 configured to receive an uplink reference signal sent by the terminal. The generating module 1001 includes: a measuring sub-module 1001a configured to measure and obtain uplink channel quality of the connections according to the uplink reference signal; a determining sub-module 1001b configured to determine the target connection according to the uplink channel quality; and a generating sub-module 1001c configured to generate RRC diversity configuration information that carries the information unit for indicating a target connection.

In some embodiments, the RRC diversity configuration information includes: an indication of enabling interworking RRC diversity and a diversity threshold, wherein the indication of enabling interworking RRC diversity is used for indicating the terminal to enable the interworking RRC diversity between a first access network device and a second access network device; and the diversity threshold is used for determining a radio bearer for transmitting the uplink RRC message.

In some embodiments, the transmitting module 1002 is configured to transmit an RRC connection reconfiguration message to the terminal, wherein the RRC connection reconfiguration message carries the RRC diversity configuration information.

It should be noted that the apparatus provided by the above embodiment is exemplified only by the above division of each of the functional modules when the apparatus implements the functions of transmitting RRC messages. In practice, the above-described functions may be assigned and completed by different functional modules in accordance with requirements, such that the internal structure of the apparatus can be divided into different functional modules to complete all or part of the functions described above.

With respect to the apparatus of the above embodiment, the specific method of operation performed by each module has been described in details in the embodiments of the method, and the description thereof may not be described in details herein.

An example of the present disclosure further provides an apparatus for transmitting a RRC message, which can implement the methods of transmitting a RRC message. The apparatus includes: a processor, and a memory configured to store instructions executable by the processor. The processor is configured to: receive RRC diversity configuration information sent by the access network device, wherein the RRC diversity configuration information is configuration information required when the terminal enables or disables RRC diversity; and determine whether to enable the RRC diversity according to the RRC diversity configuration information, wherein the RRC diversity is a way of transmitting identical uplink RRC messages through at least two connections.

In some embodiments, the RRC diversity configuration information comprises an enable indication and a diversity threshold; and the processor is configured to: enable the RRC diversity according to the enable indication; and determine, according to the diversity threshold, connections for transmitting the uplink RRC message.

In some embodiments, the access network device includes at least two Distribution Units (DUs) in a 5G communication system; the diversity threshold includes a first diversity threshold; the RRC diversity configuration information further includes a DU list comprising identifiers of DUs that support RRC diversity; the processor is configured to: detect whether downlink channel quality of a first DU is lower than the first diversity threshold, wherein the first DU is a DU that a primary serving cell corresponds to when the terminal establishes an initial connection; when the downlink channel quality of the first DU is lower than the first diversity threshold, determine at least one of second DUs as a target DU, or determine the first DU and the at least one of second DUs as target DUs, wherein the second DUs are DUs that the DU identifiers in the DU list correspond to; and select at least two connections supporting the RRC diversity between the terminal and the target DUs as connections for transmitting the uplink RRC message.

In some embodiments, the diversity threshold further includes a second diversity threshold.

In some embodiments, the processor is configured to: detect whether downlink channel quality of each of the second DUs is higher than the second diversity threshold; and when second DU candidates whose downlink channel quality is higher than the second diversity threshold exist, determine one second DU candidate randomly selected as the target DU; or, detect whether downlink channel quality of each of the second DUs is higher than the second diversity threshold; and when second DU candidates whose downlink channel quality is higher than the second diversity threshold exist, determine the second DU candidate with the best downlink channel quality as the target DU.

In some embodiments, the diversity threshold further includes a second diversity threshold.

In some embodiments, the processor is configured to: detect whether downlink channel quality of each of the second DUs is higher than the second diversity threshold; and when the downlink channel quality of all the second DUs is lower than the second diversity threshold, determine the first DU and the at least one of the second DUs as the target DUs.

In some embodiments, the access network device includes at least two Distribution Units (DUs) in a 5G communication system; the diversity threshold includes a second diversity threshold; the RRC diversity configuration information further includes a DU list comprising identifiers of DUs that support RRC diversity.

In some embodiments, the processor is configured to: detect whether downlink channel quality of each of second DUs is higher than the second diversity threshold, wherein the second DUs are DUs that the DU identifiers in the DU list correspond to; when second DU candidates whose downlink channel quality is higher than the second diversity threshold exist, determine one second DU candidate randomly selected as a target DU, or determine the second DU candidate with the best downlink channel quality as the target DU; select at least two connections supporting the RRC diversity between the terminal and the target DU as connections for transmitting the uplink RRC message.

In some embodiments, the processor is further configured to: when downlink channel quality of all the second DUs is lower than the second diversity threshold, determine the first DU and the at least one of the second DUs as the target DUs, wherein the first DU is a DU that a primary serving cell corresponds to when the terminal establishes an initial connection.

In some embodiments, the access network device includes at least two Distribution Units (Dus) in a 5G communication system; and the diversity threshold includes a first diversity threshold.

In some embodiments, the processor is further configured to: detect whether downlink channel quality of a first DU is lower than the first diversity threshold, wherein the first DU is a DU that a primary serving cell corresponds to when the terminal establishes an initial connection; when the downlink channel quality of the first DU is lower than the first diversity threshold, determine at least one of third DUs as the target DU, or determine the first DU and the at least one of third DUs as the target DUs, wherein the third DUs are DUs that support transmission of control plane messages; and select at least two connections supporting transmission of control plane messages between the terminal and the target DUs as connections for transmitting the uplink RRC message.

In some embodiments, the diversity threshold further includes a second diversity threshold.

In some embodiments, the processor is configured to: detect whether downlink channel quality of each of the third DUs is higher than the second diversity threshold; and when third DU candidates whose downlink channel quality is higher than the second diversity threshold exist, determine one third DU candidate randomly selected as the target DU;

or, detect whether downlink channel quality of each of the third DUs is higher than the second diversity threshold; and when third DU candidates whose downlink channel quality is higher than the second diversity threshold exist, determine the third DU candidate with the best downlink channel quality as the target DU.

In some embodiments, the diversity threshold further includes a second diversity threshold.

In some embodiments, the processor is configured to: detect whether downlink channel quality of each of the third DUs is higher than the second diversity threshold; and when the downlink channel quality of all the third DUs is lower than the second diversity threshold, determine the first DU and the at least one of the third DUs as the target Dus.

In some embodiments, the access network device includes at least two Distribution Units (DUs) in a 5G communication system; and the diversity threshold includes a second diversity threshold.

In some embodiments, the processor is configured to: detect whether downlink channel quality of each of the third DUs is higher than the second diversity threshold, wherein the third DUs are DUs that support transmission of control plane messages; when third DU candidates whose downlink channel quality is higher than the second diversity threshold exist, determine one third DU candidate randomly selected as the target DU, or determine the third DU candidate with the best downlink channel quality as the target DU; and select at least two connections supporting transmission of control plane messages between the terminal and the target DU as connections for transmitting the uplink RRC message.

In some embodiments, the processor is further configured to: when the downlink channel quality of all the third DUs is lower than the second diversity threshold, determine the first DU and the at least one of the third DUs as the target DUs, wherein the first DU is a DU that a primary serving cell corresponds to when the terminal establishes an initial connection.

In some embodiments, the RRC diversity configuration information further includes a maximum diversity number n.

In some embodiments, the processor is further configured to: detect whether the number of connections for transmitting the RRC message exceeds the maximum diversity number n; and when the number of connections for transmitting the RRC message exceeds the maximum diversity number, select first n connections with the best downlink channel quality as target connections for transmitting the RRC message.

In some embodiments, the RRC diversity configuration information includes an enable indication and an information unit for indicating a target connection, and the processor is further configured to: transmit an uplink reference signal to the access network device, wherein the uplink reference signal is used to measure uplink channel quality of the connections.

In some embodiments, the processor is configured to: enable the RRC diversity according to the enable indication; and determine, according to the information unit for indicating a target connection, connections for transmitting the uplink RRC message.

In some embodiments, the access network device includes a first access network device of a first communication system and a second access network device of a second communication system, wherein the first access network device is connected to the second access network device; the RRC diversity configuration information includes an indication of enabling interworking RRC diversity and a diversity threshold.

In some embodiments, the processor is configured to: enable, according to the indication of enabling interworking RRC diversity, interworking RRC diversity between the first access network device and the second access network device; and determine, according to the diversity threshold, connections for transmitting the uplink RRC message. The first communication system is one of a 5G communication system, an LTE communication system, and a WLAN communication system, and the second communication system is another one of a 5G communication system, an LTE communication system, and a WLAN communication system.

In some embodiments, the diversity threshold includes a first diversity threshold and a second diversity threshold.

In some embodiments, the processor is configured to: detect whether downlink channel quality of all or designated ones of the first access network devices is lower than the first diversity threshold, wherein the designated one of the first access network devices are first access network devices when the terminal establishes an initial connection, or first access network devices that support RRC diversity; when the downlink channel quality of all or designated ones of the first access network devices is lower than the first diversity threshold, detect whether downlink channel quality of the second access network device is higher than the second diversity threshold; when the downlink channel quality of the second access network device is higher than the second diversity threshold, determine the first access network devices and the second access network device as target access network devices; and determine at least two connections between the terminal and the target access network devices as connections for transmitting the uplink RRC message.

In some embodiments, the diversity threshold includes a relative diversity threshold.

In some embodiments, the processor is configured to: detect whether a difference obtained by subtracting the downlink channel quality of a best first access network device from the downlink channel quality of a worst second access network device is greater than the relative diversity threshold; when the difference is greater than the relative diversity threshold, determine the first and second access network device as target access network devices; and determine at least two connections between the terminal and the target access network devices as connections for transmitting the uplink RRC message. The best first access network device is a first access network device when the terminal establishes an initial connection, or a first access network device with the best downlink channel quality that supports RRC diversity, or a first access network device with the best downlink channel quality that supports transmission of control plane messages; and the worst second access network device is a second access network device with the worst downlink channel quality that supports RRC diversity, or a second access network device with the worst downlink channel quality that supports transmission of control plane messages.

In some embodiments, the RRC diversity configuration information includes a disable indication.

In some embodiments, the processor is configured to: disable the RRC diversity according to the disable indication.

In some embodiments, the processor is configured to: receive, by the terminal, an RRC connection reconfiguration message sent by the access network device, wherein the RRC connection reconfiguration message carries the RRC diversity configuration information An example of the present disclosure further provides an apparatus for transmitting a PRC message, which can implement the method for transmitting a PRC message. The apparatus includes a processor, and a memory configured to store instructions executable by the processor. The processor is configured to: generate RRC diversity configuration information of the terminal, wherein the RRC diversity configuration information is configuration information required when the terminal enables or disables RRC diversity; and transmit the RRC diversity configuration information to the terminal, wherein the RRC diversity configuration information is used to indicate the terminal whether or not to enable RRC diversity, and the RRC diversity is a way of transmitting identical uplink RRC messages through at least two connections.

In some embodiments, the RRC diversity configuration information includes: an enable indication for indicating the terminal to enable the RRC diversity and a diversity threshold for determining a radio bearer for transmitting the uplink RRC message; or, a disable indication for indicating the terminal to disable the RRC diversity.

In some embodiments, the RRC diversity configuration information further includes a maximum diversity number n, wherein the maximum diversity number n is a maximum number of connections used when the terminal transmits the identical uplink RRC messages.

In some embodiments, the RRC diversity configuration information includes an enable indication and an information unit for indicating a target connection, and the processor is configured to: receive, by the access network device, an uplink reference signal sent by the terminal; and generating, by the access network device, the RRC diversity configuration information of the terminal includes: measuring and obtaining, by the access network device, uplink channel quality of the connections according to the uplink reference signal; determining, by the access network device, the target connection according to the uplink channel quality; and generating, by the access network device, the RRC diversity configuration information that carries the information unit for indicating a target connection.

In some embodiments, the RRC diversity configuration information includes: an indication of enabling interworking RRC diversity and a diversity threshold, wherein the indication of enabling interworking RRC diversity is used for indicating the terminal to enable the interworking RRC diversity between a first access network device and a second access network device; and the diversity threshold is used for determining a radio bearer for transmitting the uplink RRC message.

In some embodiments, the processor is configured to: transmitting, by the access network device, an RRC connection reconfiguration message to the terminal, wherein the RRC connection reconfiguration message carries the RRC diversity configuration information.

Figure 12:
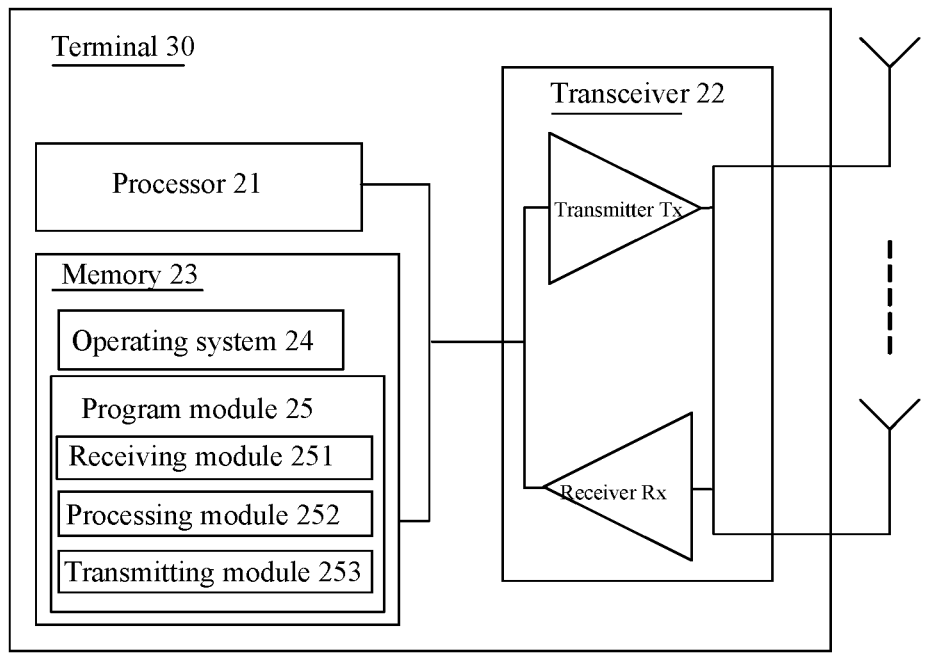
FIG. 12 is a block diagram of a terminal shown according to another example.

FIG. 12 is a block diagram of a terminal 30 shown according to an example of the present disclosure. The terminal 30 includes: a processor 21, a transceiver 22 and a memory 23.

The processor 21 includes one or more processing cores. The processor 21 operates software programs and modules, to implement various functions and information processing.

The transceiver 22 includes a receiver Rx and a transmitter Tx. The transceiver 22 may further be implemented as a communication chip which may include a receiving module, a transmitting module, a modulation-demodulation module, etc. The transceiver 22 is configured to modulate and demodulate information and receive or transmit the information through radio signals. In some embodiments, the transceiver 22 has a plurality of antennas, and the transceiver 22 may achieve multiple-antenna transmission or reception through the plurality of antennas.

The memory 23 is connected to the processor 21.

The memory 23 may be configured to store software programs and modules. The memory may store an operating system 24 and a program module 25 mentioned in at least one function.

The program module 25 at least includes: a receiving module 251 configured to receive information, a processing module 252 configured to process information, a transmitting module 253 configured for transmission, and other functional modules or program instructions which are not shown.

In some embodiments, the processor 21 is configured to implement the various modules or program instructions in the program module 25, for performing the steps to be executed by the terminal in the above embodiments.

Here, the memory 23 is a computer-readable storage medium, and may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

Persons in the art can understand that the structure of the terminal 30 shown in FIG. 12 does not limit the access network device, which may include more or less parts than those shown in the figures and may include a combination of some parts, or the arrangement of parts in therein may be different.

Figure 13:
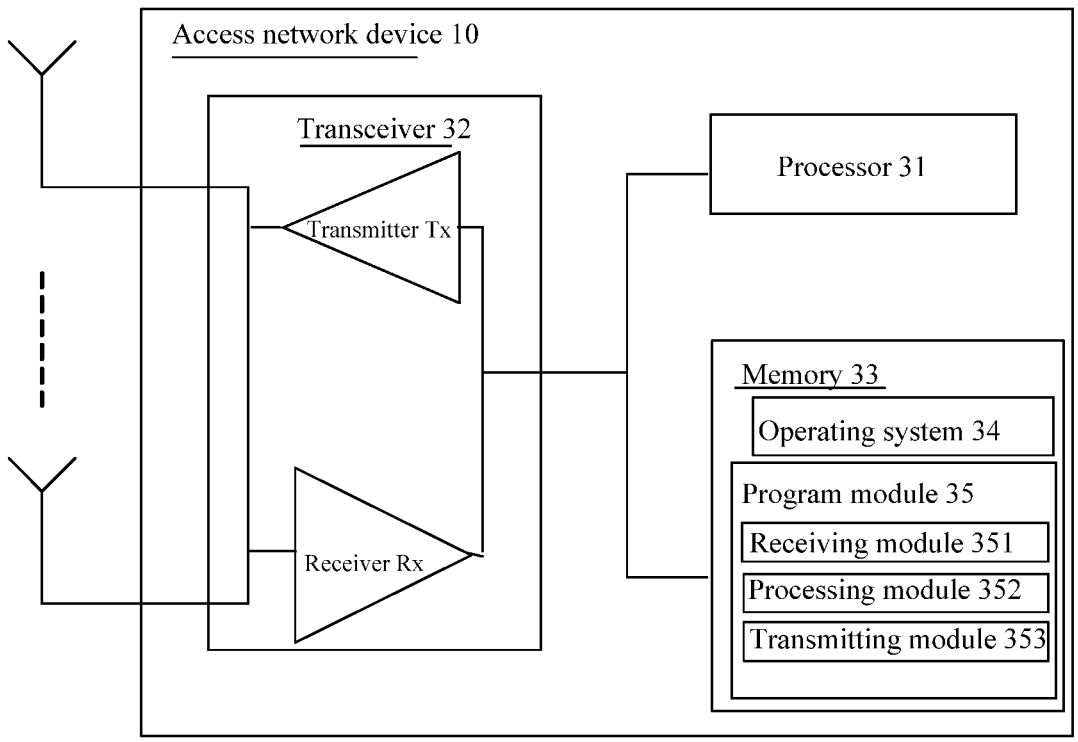
FIG. 13 is a block diagram of an access network device shown according to another example.

FIG. 13 is a block diagram of an access network device 10 shown according to an example of the present disclosure. The access network device 30 includes: a processor 31, a transceiver 32 and a memory 33.

The processor 31 includes one or more processing cores. The processor 31 operates software programs and modules, to implement various functions and information processing.

The transceiver 32 includes a receiver Rx and a transmitter Tx. The transceiver 32 may further be implemented as a communication chip which may include a receiving module, a transmitting module, a modulation-demodulation module, etc. The transceiver 32 is configured to modulate and demodulate information and receive or transmit the information through radio signals. In some embodiments, the transceiver 32 has a plurality of antennas, and the transceiver 32 may achieve multiple-antenna transmission or reception through the plurality of antennas.

The memory 33 is connected to the processor 31.

The memory 33 may be configured to store software programs and modules. The memory may store an operating system 34 and a program module 35 mentioned in at least one function.

The program module 35 at least includes: a receiving module 351 configured to receive information, a processing module 352 configured to process information, a transmitting module 353 configured for transmission, and other functional modules or program instructions which are not shown.

In some embodiments, the processor 31 is configured to implement the various modules or program instructions in the program module 35, for performing the steps to be executed by the access network device in the above embodiments.

Here, the memory 33 is a computer-readable storage medium, and may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

Persons in the art can understand that the structure of the access network device 10 shown in FIG. 12 does not limit the access network device, which may include more or less parts than those shown in the figures and may include a combination of some parts, or the arrangement of parts in therein may be different.

In examples, there is further provided a system of transmitting an RRC message, for implementing the method for transmitting an RRC message described above. The system includes a terminal and an access network device.

The terminal is configured to receive RRC diversity configuration information sent by the access network device, wherein the RRC diversity configuration information is configuration information required when the terminal enables or disables RRC diversity; and determine whether to enable the RRC diversity according to the RRC diversity configuration information, wherein the RRC diversity is a way of transmitting identical uplink RRC messages through at least two connections.

The access network device is configured to generate the RRC diversity configuration information of the terminal and send the RRC diversity configuration information to the terminal.

It is to be understood that the term "plurality" herein refers to two or more. "And/or" herein describes the correspondence of the corresponding objects, indicating three kinds of relationship. For example, A and/or B, can be expressed as: A exists alone, A and B exist concurrently, B exists alone. The character "/" generally indicates that the context object is an "OR" relationship.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. An apparatus for transmitting a Radio Resource Control (RRC) message, wherein the apparatus is applied in a communication system in which a plurality of connections are established between a terminal and an access network device, the apparatus comprising:
one or more processors;
and a memory non-transitory computer-readable storage medium storing instructions executable by the one or more processors;
wherein the one or more processors are configured to:
receive RRC diversity configuration information sent by the access network device, wherein the RRC diversity configuration information is configuration information required when the terminal enables or disables RRC diversity, and wherein the RRC diversity configuration information comprises an enable indication and a diversity threshold;
determine whether to enable the RRC diversity according to the RRC diversity configuration information, wherein the RRC diversity is a way of transmitting identical uplink RRC messages through at least two connections;
wherein the one or more processors configured to determine whether to enable the RRC diversity according to the RRC diversity configuration information are further configured to:
enable the RRC diversity according to the enable indication; and
determine, according to the diversity threshold, connections for transmitting the uplink RRC messages;
wherein the access network device comprises a central unit and at least two Distribution Units (DUs) in a 5G communication system and the at least two DUs are connected to the central unit via optical fibers; the diversity threshold comprises a first diversity threshold; the RRC diversity configuration information further comprises a DU list comprising identifiers of DUs that support RRC diversity; and
wherein the one or more processors configured to determine, according to the diversity threshold, connections for transmitting the uplink RRC messages are further configured to:
detect whether downlink channel quality of a first DU is lower than the first diversity threshold, wherein the first DU is a DU that a primary serving cell corresponds to when the terminal establishes an initial connection;
when the downlink channel quality of the first DU is lower than the first diversity threshold, determine at least one of second DUs as a target DU, or determine the first DU and the at least one of second DUs as target DUs, wherein the second DUs are DUs that the DU identifiers in the DU list correspond to; and
select at least two connections supporting the RRC diversity between the terminal and the target DUs as connections for transmitting the uplink RRC messages.

2. The apparatus for transmitting the RRC message according to claim 1, wherein the diversity threshold further comprises a second diversity threshold; and
wherein the one or more processors configured to determine at least one of the second DUs as the target DU are further configured to perform at least one of:
detect whether downlink channel quality of each of the second DUs is higher than the second diversity threshold; and when second DU candidates whose downlink channel quality is higher than the second diversity threshold exist, determine one second DU candidate randomly selected as the target DU; and
detect whether downlink channel quality of each of the second DUs is higher than the second diversity threshold; and when second DU candidates whose downlink channel quality is higher than the second diversity threshold exist, determine the second DU candidate with the best downlink channel quality as the target DU.

3. The apparatus for transmitting the RRC message according to claim 1, wherein the diversity threshold further comprises a second diversity threshold; and
wherein the one or more processors configured to determine the first DU and at least one of the second DUs as the target DUs are further configured to:
detect whether downlink channel quality of each of the second DUs is higher than the second diversity threshold; and
when the downlink channel quality of all the second DUs is lower than the second diversity threshold, determine the first DU and the at least one of the second DUs as the target DUs.

4. The apparatus for transmitting the RRC message according to claim 1, wherein the diversity threshold comprises a second diversity threshold; the RRC diversity configuration information further comprises a DU list comprising identifiers of DUs that support RRC diversity; and
wherein the one or more processors configured to determine, according to the diversity threshold, connections for transmitting the uplink RRC messages are further configured to:
detect whether downlink channel quality of each of second DUs is higher than the second diversity threshold, wherein the second DUs are DUs that the DU identifiers in the DU list correspond to;
when second DU candidates whose downlink channel quality is higher than the second diversity threshold exist, determine one second DU candidate randomly selected as a target DU, or
determine the second DU candidate with the best downlink channel quality as the target DU;
select at least two connections supporting the RRC diversity between the terminal and the target DU as connections for transmitting the uplink RRC message.

5. The apparatus for transmitting the RRC message according to claim 4, wherein after detecting whether downlink channel quality of each of the second DUs is higher than the second diversity threshold, and wherein the one or more processors are further configured to:
when downlink channel quality of all the second DUs is lower than the second diversity threshold, determine the first DU and the at least one of the second DUs as the target DUs, wherein the first DU is a DU that a primary serving cell corresponds to when the terminal establishes an initial connection.

6. The apparatus for transmitting the RRC message according to claim 1, wherein the diversity threshold comprises a first diversity threshold; and
wherein the one or more processors configured to determine, according to the diversity threshold, connections for transmitting the uplink RRC message are further configured to:
detect whether downlink channel quality of a first DU is lower than the first diversity threshold, wherein the first DU is a DU that a primary serving cell corresponds to when the terminal establishes an initial connection;
when the downlink channel quality of the first DU is lower than the first diversity threshold, determine at least one of third DUs as a target DU, or
determine the first DU and the at least one of third DUs as the target DUs, wherein the third DUs are DUs that support transmission of control plane messages; and select at least two connections supporting transmission of control plane messages between the terminal and the target DUs as connections for transmitting the uplink RRC messages.

7. The apparatus for transmitting the RRC message according to claim 6, wherein the diversity threshold further comprises a second diversity threshold; and
wherein the one or more processors configured to determine at least one of the third DUs as the target DU are further configured to perform one of following acts:
detect whether downlink channel quality of each of the third DUs is higher than the second diversity threshold; and
when third DU candidates whose downlink channel quality is higher than the second diversity threshold exist, determine one third DU candidate randomly selected as the target DU; or
detect whether downlink channel quality of each of the third DUs is higher than the second diversity threshold; and
when third DU candidates whose downlink channel quality is higher than the second diversity threshold exist, determine the third DU candidate with the best downlink channel quality as the target DU.

8. The apparatus for transmitting the RRC message according to claim 6, wherein the diversity threshold further comprises a second diversity threshold; and
wherein the one or more processors configured to determine the first DU and at least one of the third DU as the target DUs are further configured to:
detect whether downlink channel quality of each of the third DUs is higher than the second diversity threshold; and when the downlink channel quality of all the third DUs is lower than the second diversity threshold, determine the first DU and the at least one of the third DUs as the target DUs.

9. The apparatus for transmitting the RRC message according to claim 1, wherein the access network device comprises at least two Distribution Units (Dus)in a 5G communication system; the diversity threshold comprises a second diversity threshold; and
wherein the one or more processors configured to determine, according to the diversity threshold, connections for transmitting the uplink RRC message are further configured to:
detect whether downlink channel quality of each of the third DUs is higher than the second diversity threshold, wherein the third DUs are DUs that support transmission of control plane messages;
when third DU candidates whose downlink channel quality is higher than the second diversity threshold exist, determine one third DU candidate randomly selected as a target DU, or determine the third DU candidate with the best downlink channel quality as the target DU; and
select at least two connections supporting transmission of control plane messages between the terminal and the target DU as connections for transmitting the uplink RRC message.

10. The apparatus for transmitting the RRC message according to claim 9, wherein after detecting whether the downlink channel quality of each of the third DUs is higher than the second diversity threshold, and wherein the one or more processors are further configured to:
when the downlink channel quality of all the third DUs is lower than the second diversity threshold, determine the first DU and the at least one of the third DUs as the target DUs, wherein the first DU is a DU that a primary serving cell corresponds to when the terminal establishes an initial connection.

11. The apparatus for transmitting the RRC message according to claim 9, wherein the RRC diversity configuration information comprises an enable indication and an information unit for indicating a target connection; before receiving, by the terminal, RRC diversity configuration information sent by the access network device, and wherein the one or more processors are further configured to:
   transmit an uplink reference signal to the access network device, wherein the uplink reference signal is used to measure uplink channel quality of the connections; and
   determine whether to enable the RRC diversity according to the RRC diversity configuration information comprises:
   enable the RRC diversity according to the enable indication; and
   determine, according to the information unit for indicating a target connection, connections for transmitting the uplink RRC message.

12. The apparatus for transmitting the RRC message according to claim 9, wherein the access network device comprises a first access network device of a first communication system and a second access network device of a second communication system, wherein the first access network device is connected to the second access network device; the RRC diversity configuration information comprises an indication of enabling interworking RRC diversity and a diversity threshold; and
   wherein the one or more processors configured to determine whether to enable the RRC diversity according to the RRC diversity configuration information are further configured to:
   enable, according to the indication of enabling interworking RRC diversity, interworking RRC diversity between the first access network device and the second access network device; and
   determine, according to the diversity threshold, connections for transmitting the uplink RRC message;
   wherein the first communication system is one of a 5G communication system, an LTE communication system, and a WLAN communication system, and the second communication system is another one of a 5G communication system, an LTE communication system, and a WLAN communication system.

13. The apparatus for transmitting the RRC message according to claim 12, wherein the diversity threshold comprises a first diversity threshold and a second diversity threshold; and
   wherein the one or more processors configured to determine according to the diversity threshold, connections for transmitting the uplink RRC message are further configured to:
   detect whether downlink channel quality of all or designated ones of the first access network devices is lower than the first diversity threshold, wherein the designated one of the first access network devices are first access network devices when the terminal establishes an initial connection, or first access network devices that support RRC diversity;
   when the downlink channel quality of all or designated ones of the first access network devices is lower than the first diversity threshold, detect whether downlink channel quality of the second access network device is higher than the second diversity threshold;
   when the downlink channel quality of the second access network device is higher than the second diversity threshold, determine the first access network devices and the second access network device as target access network devices; and
   determine at least two connections between the terminal and the target access network devices as connections for transmitting the uplink RRC message.

14. The apparatus for transmitting the RRC message according to claim 12, wherein the diversity threshold comprises a relative diversity threshold; and
   wherein the one or more processors configured to determine, according to the diversity threshold, connections for transmitting the uplink RRC message are further configured to:
   detect whether a difference obtained by subtracting a downlink channel quality of a best first access network device from the downlink channel quality of a worst second access network device is greater than the relative diversity threshold;
   when the difference is greater than the relative diversity threshold, determine the first and second access network device as target access network devices; and
   determine at least two connections between the terminal and the target access network devices as connections for transmitting the uplink RRC message,
   wherein the best first access network device is a first access network device when the terminal establishes an initial connection, or a first access network device with the best downlink channel quality that supports RRC diversity, or a first access network device with the best downlink channel quality that supports transmission of control plane messages; and the worst second access network device is a second access network device with the worst downlink channel quality that supports RRC diversity, or a second access network device with the worst downlink channel quality that supports transmission of control plane messages.

15. The apparatus for transmitting the RRC message according to claim 1, wherein the RRC diversity configuration information further comprises a maximum diversity number, and
   wherein the one or more processors are further configured to:
   detect whether a number of connections for transmitting the uplink RRC messages exceeds the maximum diversity number; and
   select, when the number of connections exceeds the maximum diversity number, first maximum diversity number of connections with best downlink channel qualities as target connections for transmitting the uplink RRC messages.

16. The apparatus for transmitting the RRC message according to claim 1, wherein the one or more processors configured to receive RRC diversity configuration information sent by the access network device are further configured to:
   receive an RRC connection reconfiguration message sent by the access network device, wherein the RRC connection reconfiguration message carries the RRC diversity configuration information.

17. An apparatus for transmitting a Radio Resource Control (RRC) message, wherein the apparatus is applied in a communication system in which a plurality of connections are established between a terminal and an access network device, the apparatus comprising:
   one or more processors;

and a non-transitory computer-readable storage medium storing instructions executable by the one or more processors;

wherein the one or more processors are configured to:

generate RRC diversity configuration information of the terminal, wherein the RRC diversity configuration information is configuration information required when the terminal enables or disables RRC diversity, wherein the RRC diversity configuration information comprises an enable indication for indicating the terminal to enable the RRC diversity and a diversity threshold for determining connections for transmitting uplink RRC messages;

transmit the RRC diversity configuration information to the terminal, wherein the RRC diversity configuration information is used for determining whether the terminal enables RRC diversity, and the RRC diversity is a way of transmitting identical uplink RRC messages through at least two connections;

wherein the access network device comprises a central unit and at least two Distribution Units (DUs) in a 5G communication system and the at least two DUs are connected to the central unit via optical fibers; the diversity threshold comprises a first diversity threshold; the RRC diversity configuration information further comprises a DU list comprising identifiers of DUs that support RRC diversity; and wherein determining connections for transmitting the uplink RRC messages comprises:

detecting whether downlink channel quality of a first DU is lower than the first diversity threshold, wherein the first DU is a DU that a primary serving cell corresponds to when the terminal establishes an initial connection;

when the downlink channel quality of the first DU is lower than the first diversity threshold, determining at least one of second DUs as a target DU, or determine the first DU and the at least one of second DUs as target DUs, wherein the second DUs are DUs that the DU identifiers in the DU list correspond to; and selecting at least two connections supporting the RRC diversity between the terminal and the target DUs as connections for transmitting the uplink RRC messages.

18. The apparatus for transmitting the RRC message according to claim 17, wherein the RRC diversity configuration information comprises:

a disable indication for indicating the terminal to disable the RRC diversity.

19. The apparatus for transmitting the RRC message according to claim 17, wherein the RRC diversity configuration information comprises an enable indication and an information unit for indicating a target connection; prior to generating, by the access network device, RRC diversity configuration information of the terminal, the one or more processors are further configured to:

receive, by the access network device, an uplink reference signal sent by the terminal;

generate, by the access network device, the RRC diversity configuration information of the terminal comprises:

measure and obtain, by the access network device, uplink channel quality of the connections according to uplink reference signal;

determine, by the access network device, the target connection according to the uplink channel quality; and generate, by the access network device, the RRC diversity configuration information that carries the information unit for indicating a target connection.

20. The apparatus for transmitting the RRC message according to claim 17, wherein the RRC diversity configuration information comprises:

an indication of enabling interworking RRC diversity and a diversity threshold, wherein the indication of enabling interworking RRC diversity is used for indicating the terminal to enable the interworking RRC diversity between a first access network device and a second access network device; and the diversity threshold is used for determining a radio bearer for transmitting the uplink RRC message.

* * * * *